(12) United States Patent
Riekstins et al.

(10) Patent No.: US 10,366,028 B2
(45) Date of Patent: Jul. 30, 2019

(54) SYSTEMS AND METHODS FOR DEVICE COMMUNICATIONS

(71) Applicant: Ossia Inc., Bellevue, WA (US)

(72) Inventors: Valdis Janis Riekstins, Woodinville, WA (US); Joshua B. Hardy, Woodinville, WA (US); Ahmad Reza Abdolhosseini Moghaddam, Kirkland, WA (US)

(73) Assignee: Ossia Inc., Bellevue, WA (US)

( * ) Notice: Subject to any disclaimer, the term of this patent is extended or adjusted under 35 U.S.C. 154(b) by 220 days.

(21) Appl. No.: 15/279,729

(22) Filed: Sep. 29, 2016

(65) Prior Publication Data

US 2018/0089120 A1   Mar. 29, 2018

(51) Int. Cl.
*G06F 13/364*   (2006.01)
*G06F 13/40*    (2006.01)
*G06F 13/42*    (2006.01)

(52) U.S. Cl.
CPC .......... *G06F 13/364* (2013.01); *G06F 13/404* (2013.01); *G06F 13/4282* (2013.01)

(58) Field of Classification Search
CPC ... G06F 13/364; G06F 13/404; G06F 13/4282
See application file for complete search history.

(56) References Cited

U.S. PATENT DOCUMENTS

| | | | | |
|---|---|---|---|---|
| 5,939,997 A | * | 8/1999 | Sekine | G06F 13/4086 340/13.37 |
| 2005/0216631 A1 | * | 9/2005 | Daly | G06F 13/4256 710/110 |
| 2009/0138638 A1 | * | 5/2009 | Russo | G06F 13/4291 710/106 |
| 2012/0194712 A1 | * | 8/2012 | Crook | H04N 5/247 348/262 |
| 2013/0262710 A1 | * | 10/2013 | Luo | H01Q 1/243 710/9 |
| 2016/0205066 A1 | * | 7/2016 | Attarwala | H04L 12/40 709/208 |

* cited by examiner

*Primary Examiner* — Eric T Oberly

(57) ABSTRACT

Systems and methods for improvement in bus communications with daisy-chained connected devices are described herein. In some embodiments, a bus communication system comprises a master chain controller, a first peripheral device, and a second peripheral device. A first communication bus couples a master interface port of the master chain controller to a slave interface port of the first peripheral device, and a second communication bus couples a master interface port of the first peripheral device to a slave interface port of the second peripheral device. The first communication device is configured to receive a communication packet via the first communication bus and to send a copy of the communication packet to the second peripheral device during transmission of the communication packet to the first peripheral device. The first communication device is also configured to send an idle state signal to the master chain controller.

22 Claims, 23 Drawing Sheets

SYSTEMS AND METHODS FOR DEVICE COMMUNICATIONS

TECHNICAL FIELD

The technology described herein relates generally to the field of device communication and, more specifically, to systems and methods for improved communication to a chain of devices.

BACKGROUND

The Serial Peripheral Interface (SPI) bus is a synchronous serial communication interface protocol, whose specification is a use for short distance communication, typically between microcontrollers or processors and peripheral devices. FIG. 1A illustrates an SPI bus 10 between a single master device 12 and a single slave device 14. This is master-slave architecture with a single master as known in the art. The SPI bus defines four logic signals between the master 12 and slave 14 devices that include: SCLK (Serial Clock (output from master)), MOSI (Master Output, Slave Input (output from master)), MISO (Master Input, Slave Output (output from slave)), and SS (Slave Select (active low, output from master)). The master and slave devices 12, 14 may communicate and exchange data via the four logic signals.

The SPI bus protocol allows a single master device to communicate with multiple slave devices. As illustrated in FIG. 1B, master device 12, includes a dedicated slave select line to each slave device 14. The master device communicates with a particular slave device 14, by controlling the slave select SSn output line, to the slave device SSn input, typically by driving the desired slave select SSn line to a logic low signal level, while leaving the other slave SSn output select lines at a logic high signal level. The master device, while individually controlling the slave select lines of multiple slave devices 14, can communicate with a select slave of a plurality of slave devices 14, the master device 12 requires multiple output pins to accomplish this type of communication.

FIG. 1C illustrates known SPI bus communication between master device 12 and multiple slave devices 14 according to another communication setup. As shown, slave devices 14 are daisy-chained together. In this setup, master device 12 communicates with slave devices 14 using just the four logic signals on the SPI bus 10. As shown, the MOSI output of master device 12 connects to MOSI input of the first slave device 14, and the MISO output of the first slave device 14 connects to MOSI input of the next slave device 14 and so on. Using this connection architecture, the whole chain may act as a simple shift-register communication chain. If a transaction from the master device 12 to a single slave device 14 in the chain of slave devices takes N bits to complete, and if there are D number of devices in the SPI chain, the master device 12 needs to shift out N×D bits serially before closing the transaction. Furthermore, read data would have to be shifted out of the device chain (N×D bits), with the last slave device 14 in the chain sending its output data all the way back to the chain controller (i.e., master device 12) at the start of the chain.

The simple 4-wire interface of SPI becomes cumbersome when more and more slave devices connect to the serial chain. Suddenly, the master device 12 must drive 2 signals common to all devices in the chain: the sensitive clocking signal for the transaction and the slave select. If the chain were to grow too long, the master clock signal would need special consideration to supply clean, reliable edges to all slave clock input pins simultaneously. In addition, the device chain must be organized more like a circle to facilitate the MISO line from slave n back to the master. Since slave n's MISO line is the line that carries all read-back data to the master device in the chain, and in order to maintain timing, this line needs to be as short as possible. Therefore, the first and last slave devices in the chain would ideally be very near the master device controller.

Accordingly, a need exists for technology that overcomes the problem demonstrated above, as well as one that provides additional benefits. The examples provided herein of some prior or related systems and their associated limitations are intended to be illustrative and not exclusive. Other limitations of existing or prior systems will become apparent to those of skill in the art upon reading the following Detailed Description.

OVERVIEW

In one example, a bus communication system comprises a master chain controller comprising a master interface port, a first peripheral device comprising a master interface port and a slave interface port, a second peripheral device comprising a slave interface port, a first communication bus coupling the master interface port of the master chain controller to the slave interface port of the first peripheral device, and a second communication bus coupling the master interface port of the first peripheral device to the slave interface port of the second peripheral device. The first communication device is configured to receive a master-to-slave communication packet from the master chain controller via the first communication bus and send a copy of the master-to-slave communication packet to the second peripheral device, wherein the first peripheral device is configured to begin sending a copy of a received portion of the master-to-slave communication packet to the second peripheral device during transmission of the master-to-slave communication packet from the master chain controller to the first peripheral device. The first communication device is also configured to send an idle state signal to the master chain controller after sending the copy of the master-to-slave communication packet to the second peripheral device.

In another example, a communication system comprises a plurality of slave devices, wherein each slave device comprises a master interface port and a slave interface port; a plurality of communication busses, wherein at least a portion of the communication busses is configured to couple the plurality of slave devices together in a daisy chain arrangement; and a master device comprising a master interface port coupled to the slave interface port of a first slave device of the plurality of slave devices via a master communication bus of the plurality of communication busses. The first slave device is configured to receive a master-to-slave communication packet from the master device; send a copy of the master-to-slave communication packet to another of the plurality of slave devices, wherein the first slave device is configured to begin sending a copy of a received portion of the master-to-slave communication packet to the another of the plurality of slave devices during transmission of the master-to-slave communication packet from the master device to the first slave device; and send an idle state signal indicative of an idle state of the first slave device to the master device after sending the copy of the master-to-slave communication packet to the another of the plurality of slave devices.

In yet another example, a method of communication in a communication bus comprising a master controller device coupled to a plurality of slave devices coupled together in a daisy chain arrangement comprises sending an instruction packet from the master controller device to a primary slave device of the plurality of slave devices coupled to the master controller via a master communication bus; initiating the sending of a copy of the instruction packet from the primary slave device to a secondary slave device of the plurality of slave devices coupled to the primary slave device via a slave communication bus during the sending of the instruction packet from the master controller device to the primary slave device; completing the sending of the copy of the instruction packet from the primary slave device to the secondary slave device after the master controller device has completed sending the instruction packet to the primary slave device; and sending a signal from the primary slave device to the master controller device indicating an idle state of the primary slave device after completing the sending of the copy of the instruction packet to the secondary slave device.

The details of one or more examples of the disclosure are set forth in the accompanying drawings and the description below. Other features, objects, and advantages of the disclosure will be apparent from the description and drawings, and from the claims.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Figure 1A:
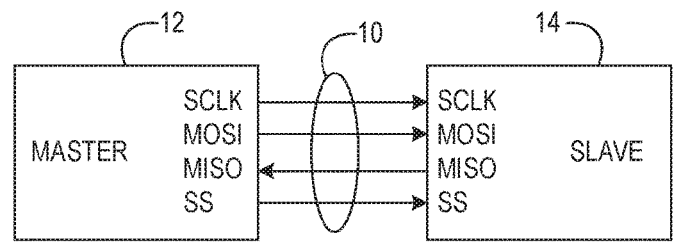
FIGS. 1A-C illustrate prior art block diagrams depicting a master device, communication protocol connection, with one or more slave devices over an SPI bus.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but no other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

Figure 2:
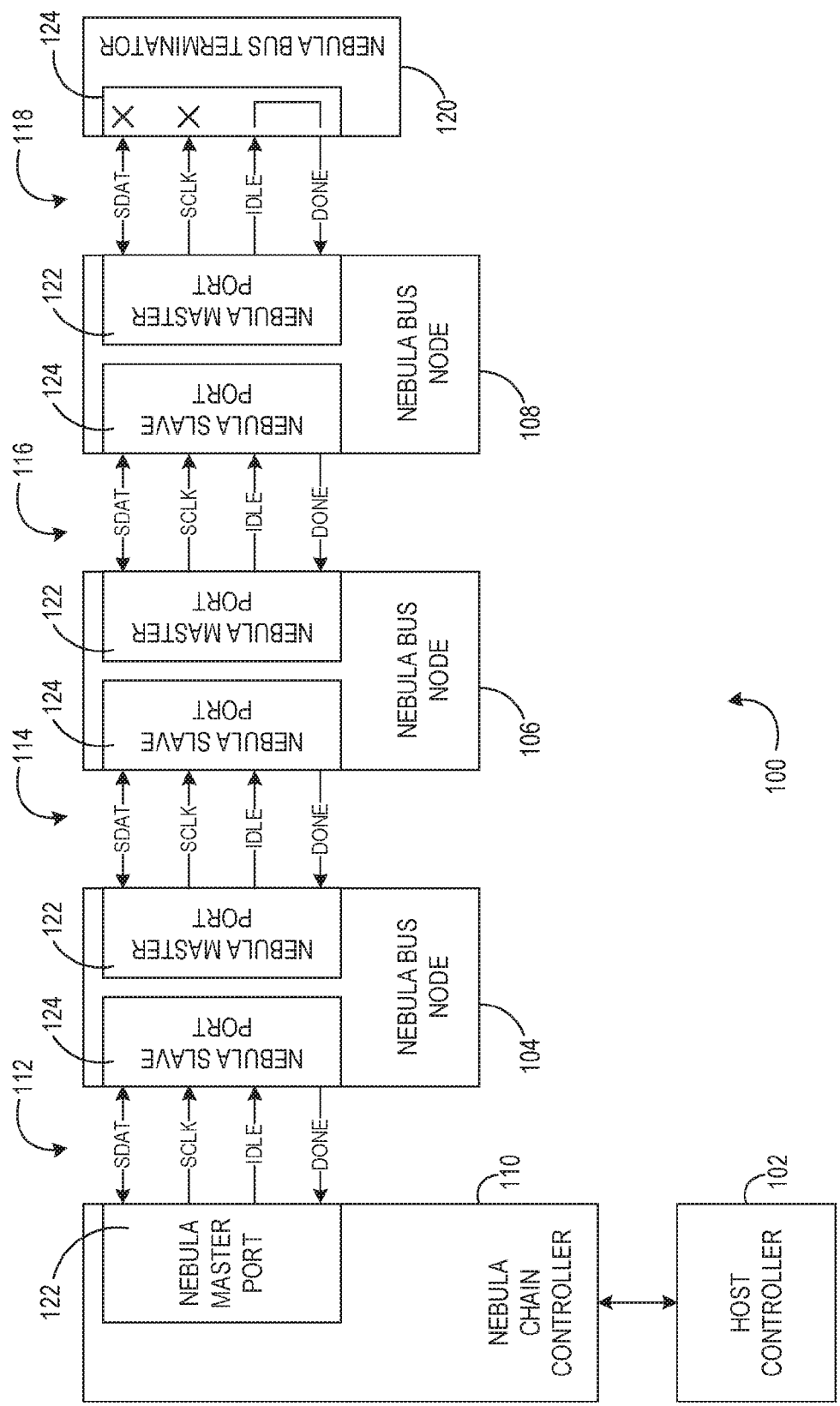
FIG. 2 illustrates a block diagram of a peripheral communication system in accordance with some embodiments.

FIG. 2 illustrates a block diagram of a peripheral communication system 100 in accordance with an embodiment of the invention, hereinafter referred to as the Nebula system. Nebula system 100 includes a host controller 102 and a plurality of peripherals or Nebula bus nodes 104, 106, 108 with which the host controller 102 is set up to communicate. For example, Nebula bus nodes 104, 106, 108 may be components such as other microcontrollers, field-programmable gate arrays (FPGA), application-specific integrated circuits (ASIC), real time clocks, amplifiers, shift registers, sensors, LCD display controllers, memory modules, digital potentiometers, and other peripheral devices known in the art as peripheral devices.

To communicate with Nebula bus nodes 104, 106, 108 host controller 102 is coupled to a Nebula chain controller 110, which is at the beginning of the Nebula bus chain. Each Nebula bus nodes 104, 106, 108 is coupled to an upstream device or node and to a downstream device or node via a separate Nebula bus. FIG. 2 depicts the bus connections for the Nebula chain controller device 110 and Nebula bus node device 104. These two devices are connected by a first Nebula bus 112. Nebula bus node device 104 and Nebula bus node device 106 are connected by a second Nebula bus 114. Nebula bus node device 106 and Nebula bus node device 108 are connected by a third Nebula bus 116. Nebula bus node device 108 is connected by a fourth Nebula bus node 118 and to Nebula bus terminator 120.

Nebula chain controller 110 and Nebula bus nodes 104-108, 106, 10 include a Nebula master port 122 for communicating with a downstream device. Nebula bus node 104, 106, 108 also include a Nebula slave port 124 for communicating with an upstream device. By inspection, the Nebula chain controller 110 is not connected to an upstream device by a Nebula bus. In this case, it is not necessary to have a Nebula slave port. However, in some embodiments, the Nebula chain controller 110 may also include a Nebula slave port.

Figure 3:
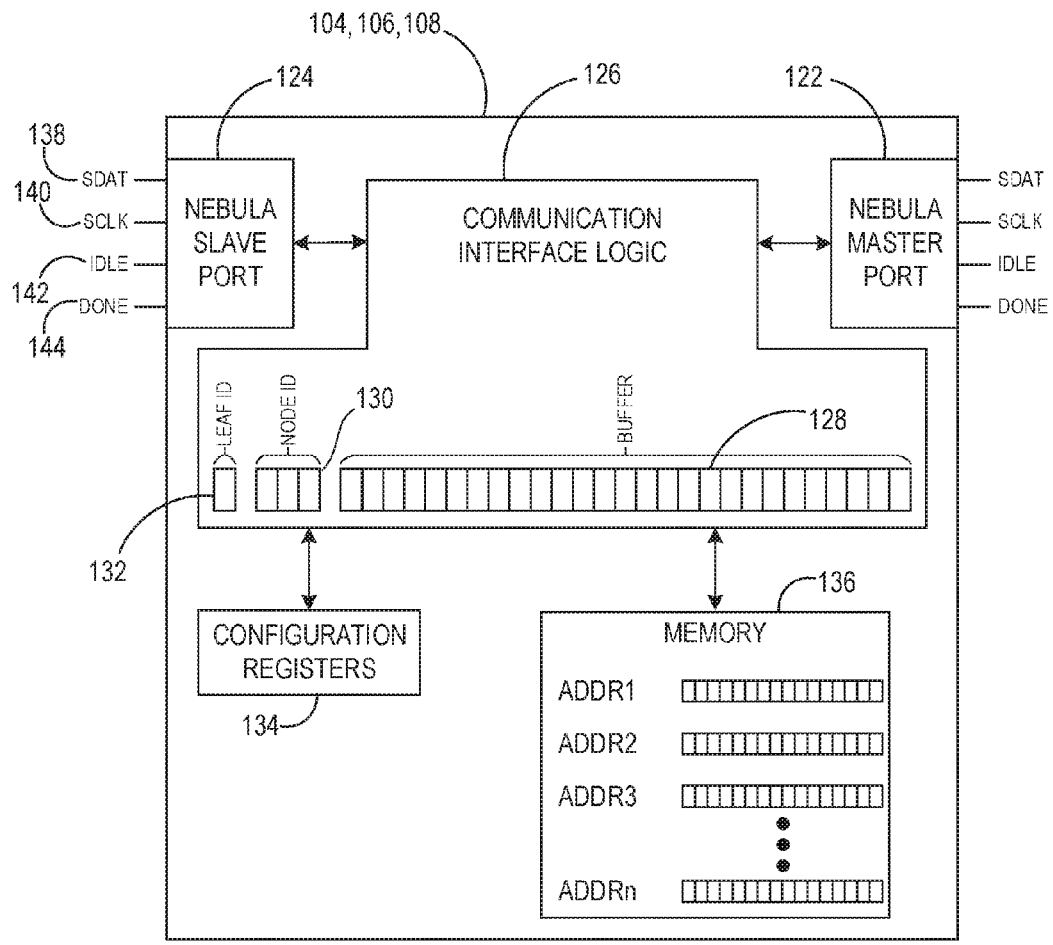
FIG. 3 illustrates a block diagram of a peripheral node device in accordance with some embodiments.

Referring to FIG. 3, a block diagram of a peripheral node device is shown according to some embodiments. Each Nebula bus node 104, 106, 108 includes a communication interface logic 126 configured to receive information from either Nebula master port 122 or Nebula slave port 124 and to act on that information as instructed as part of a Nebula communication cycle. In an embodiment, communication interface logic 126 is a controller or processor programmed to transmit Nebula bus communication packets between Nebula master port 122 and Nebula slave port 124 as well as to respond to instructions contained in the communication packets as described herein. Communication interface logic 126 includes a buffer 128 set aside in memory to at least temporarily store data transmitted during the Nebula communication cycle. A node ID 130 and a leaf ID 132 are also set aside in memory to determine how and when Nebula bus nodes 104, 106, 108 should behave during the Nebula communication cycle as will be described below.

Nebula bus nodes 104, 106, 108 also include one or more configuration registers, 134, configured to set up the node according to the Nebula communication protocol, including configuring and allocating of data buffers and identification spots in memory. The buffers and identification spots are configurable via the configuration registers 134 depending on a number of factors such as the number of nodes 104, 106, 108 in the Nebula system 100 and the size of memory each peripheral device 104, 106, 108 contains. For example, the Node ID may be increased to account for a larger number of devices. The setup of configuration registers 134 may be accomplished using a package file, and all peripheral devices 104, 106, 108 are preferably set up in the same manner. A bank of memory 136 may also be part of node 104, 106, 108 as part of its configuration as a peripheral device.

Referring back to FIG. 2, each Nebula bus, 112-118, includes four lines involved in exchanging signals on a single Nebula interface between adjacent connected components. The signals produced on these lines correspond with logic low signal levels or logic high signal levels. The logic signal level may be implemented by using either single-ended or differential signal levels.

The first line is the Serial DATA (SDAT) line 138. The SDAT line 138 is a bidirectional line between master and slave sides (122, 124) of the NEBULA interface. Transaction controls and write data are driven by the Nebula master port 122. Readback data are driven by the Nebula slave port 124. This line may be pulled to a logic low signal level by a pulldown resistor at the master side of the NEBULA interface 112-118. Some embodiments may use 2 uni-directional lines (MOSI/MISO) instead of a single bi-directional line.

The second line is the Serial CLOCK (SCLK) line 140. The SCLK line is always driven by the Nebula master port 122. The clock signals on the SCLK line 140 are not free-running such that no clock signals exist on the bus when the bus is idle. Instead, clock signals on this line occur only during an active transaction or Nebula communication cycle.

The third line is the IDLE line 142. The IDLE line is always driven by the Nebula master port 122 and forms a master IDLE handshaking control line. The Nebula master port 122 uses the IDLE line 142 to signal active transactions by bringing this line low during the entire transaction. The slave side (124) of the NEBULA interface is controlled to immediately go to an idle state when the IDLE line 142 is active. IDLE 142 may be pulled to a logic low signal level by a pulldown resistor at the slave side (124) of the NEBULA interface 112-118.

The fourth line is the DONE line 144 and forms a slave DONE handshaking control line. The Nebula slave port 124 of the NEBULA interface has exclusive control over this line and uses it to indicate when the slave is complete with the current transaction and has returned to its idle state. The completion of the current transaction in the slave may be controlled by an active value on the IDLE handshaking line from the Nebula master port 122. DONE 144 may pulled to a logic low signal level by a pulldown resistor at the master side (122) of the NEBULA interface 112-118.

Nebula bus terminator 120 is connected to the Nebula master port 122 of the last Nebula bus node (e.g., Nebula bus node 106) to terminate the Nebula communication bus. To terminate the interface chain, Nebula bus terminator 120 has its connections to the IDLE and DONE lines 142, 144 mechanically shorted in its slave port 124. As described below, the last Nebula bus node uses the shorted IDLE and DONE lines 142, 144 to detect that it is the last node.

Figure 4:
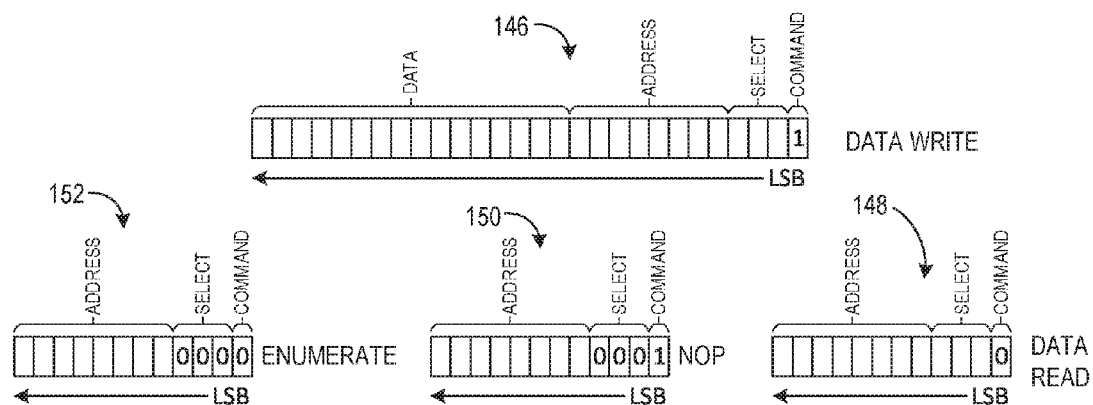
FIG. 4 illustrates master-to-slave device communication packets in accordance with some embodiments.
Figure 5:
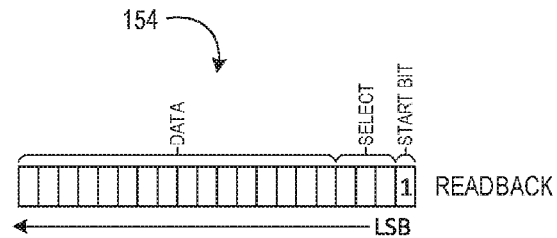
FIG. 5 illustrates a slave-to-master device communication packet in accordance with some embodiments.

FIGS. 4 and 5 illustrate schematic diagrams of master-to-slave and slave-to-master communication packets between Nebula components across Nebula buses 112-118. The Nebula communication packets shown in FIGS. 4 and 5 depict an example protocol and do not intend to define the number of bits present in each packet part.

In an embodiment, the Nebula communication packets contain a COMMAND field and a SELECT field and may contain either or both of an ADDRESS field and a DATA field. The COMMAND field instructs the downstream device to behave according to the command. The COMMAND field may be any bit width, but it is recommended to keep the COMMAND field width set to the minimum number of bits to minimize transaction overhead. For example, if only two transaction types are used (e.g., WRITE and READ), then only a single COMMAND bit is needed. While FIGS. 4 and 5 illustrate two commands (WRITE and READ), other types of commands are allowable within the Nebula communication protocol assuming that the devices can be configured or can be programmed to act according to additional commands not disclosed herein. These additional commands may require changing the bit width of the COMMAND field to account for the total number of commands available.

The SELECT field allows individual nodes to be selected as participants of the transaction. The width of the SELECT field should be chosen so that it is at least as wide as the number of nodes in the device chain. In one embodiment, each node corresponds with a respective bit in the SELECT field such that the number of bits in the SELECT field is equal to the number of slave or peripheral devices in the Nebula-based system. If a node should be involved in the read or write transaction, its corresponding SELECT bit should be set active in the transaction. Alternatively, the SELECT field may contain the number of bits required to address each of the nodes using a sequential binary sequence such that, for example, the nodes are addressed starting with 1, 2, and so on until the last node is addressed. Starting the node addressing with 1 instead of 0 allows zero to be used for special transactions as described below; however, if desired, zero-based addressing scheme may also be used.

The ADDRESS field is the part of the Nebula communication packets that may be used to specify the memory address into which data is meant to be written or from which data is meant to be read. The ADDRESS field is configurable to be any desired bit width, but ideally, this field is bit set to the minimum number of bits needed to access the desired memory space to minimize transaction overhead.

The DATA field is the memory read/write data for the transaction. Data that are to be written into a slave device memory is incorporated into a Nebula communication write packet, and data read from slave device memory is communicated back to a master device via a Nebula communication Readback packet.

FIG. 4 shows communication packets configured to communicate commands from the master interface port (e.g., port 122) of an upstream device to the slave interface port (e.g., port 124) of the downstream device connected thereto by a Nebula bus. For discussion of the Nebula communications packets herein as well as in the Figures, the COMMAND field comprises one bit, the SELECT field comprises three bits, the ADDRESS field comprises eight bits, and the DATA field comprises sixteen bits. This packet configuration is merely for example and, as stated herein, is configurable depending on the layout of the Nebula system. For example, if a system containing a Nebula bus includes only two nodes on the bus, the configuration of the Nebula communication packets may have only two bits in the SELECT field.

A data write packet 146 is illustrated in FIG. 4 that includes all four of the Nebula communication packet fields. The data write packet 146 begins at the least-significant-bit (LSB) with a COMMAND instruction of 1 followed by the SELECT, ADDRESS, and DATA fields appropriately filled in to identify which peripheral devices or nodes are commanded to respond to the data write packet 146 in order to write the data into the corresponding memory address.

The data read packet 148 includes three nebula communication packet fields. The fields are the COMMAND, SELECT, and ADDRESS fields. In this example, the DATA field is not required. A Nebula node, in this example, would not do anything with data sent in the DATA field from an upstream master device or node. As such, omitting sending the DATA field reduces the time needed for the DATA READ command cycle. However, data read packet 148 may include information in the DATA field in some embodiments. The data read packet 148 begins with a COMMAND instruction of 0 followed by the SELECT, and ADDRESS fields appropriately filled in to identify which peripheral devices or nodes are commanded to report back the data found in their memory at the ADDRESS field memory location.

A no-operation or NOP packet 150 includes a 1 in the COMMAND instruction field and no selected nodes in the SELECT field. The NOP packet 150 sends a communication from master to slave devices but does not cause the slave devices to write data or to respond with Readback data.

An enumeration packet 152 includes a 0 in the COMMAND instruction and no selected nodes in the SELECT field. The enumeration packet 152 is used during a system setup procedure as discussed below.

The NOP packet 150 and the enumeration packet 152 are illustrated in FIG. 4 as including an ADDRESS field. The commands responsive to these packets in the Nebula bus nodes do not take into account any data contained in the ADDRESS field. While the examples shown herein include the ADDRESS field, in other embodiments, the ADDRESS field may be omitted.

FIG. 5 illustrates a Readback packet 154 sent in a slave-to-master communication as a result of receiving a data write packet 146 instruction for the specified or selected node. The Readback packet 154 includes a START BIT value of 1 followed by the SELECT field containing the node ID of the peripheral device sending the memory data followed by the memory data populated in the DATA field. An example of a data read packet 148 command followed by a Readback packet 154 response is discussed below with respect to FIGS. 17-20.

Figure 6:
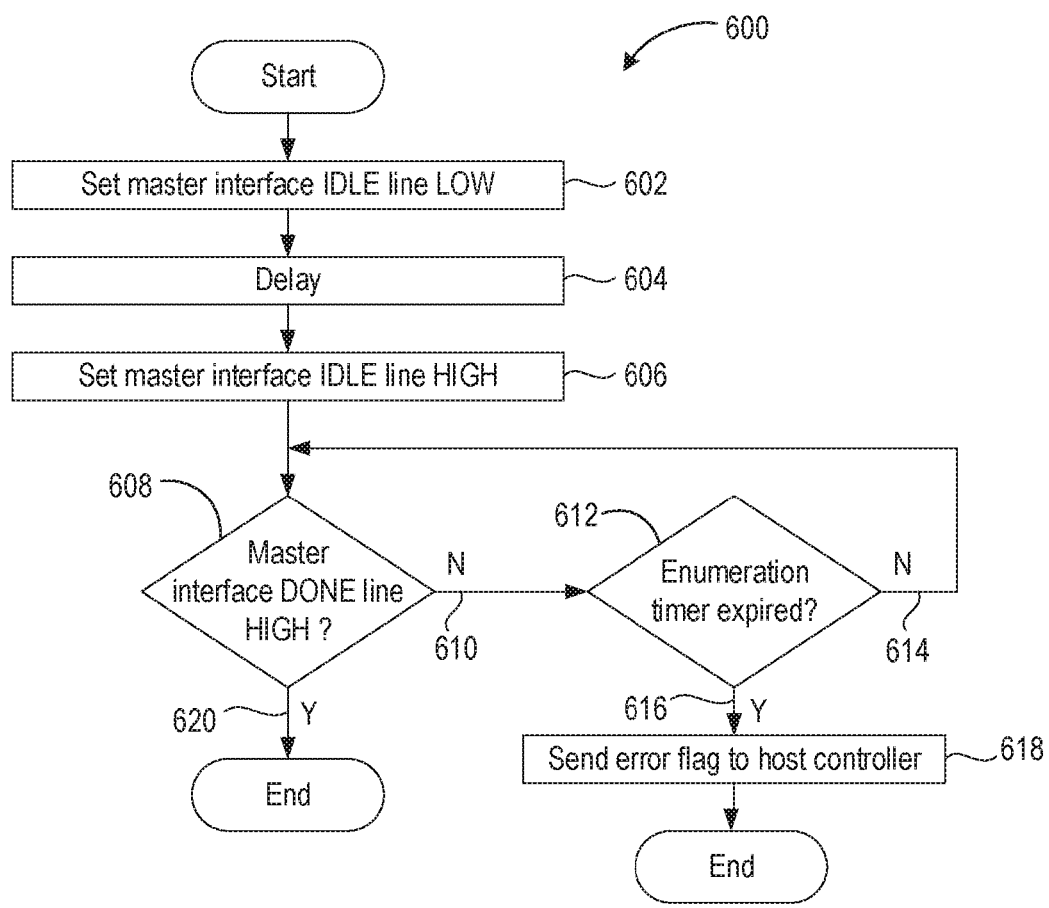
FIG. 6 illustrates a flow diagram for an example discovery phase, controller process in accordance with some embodiments.
Figure 7:
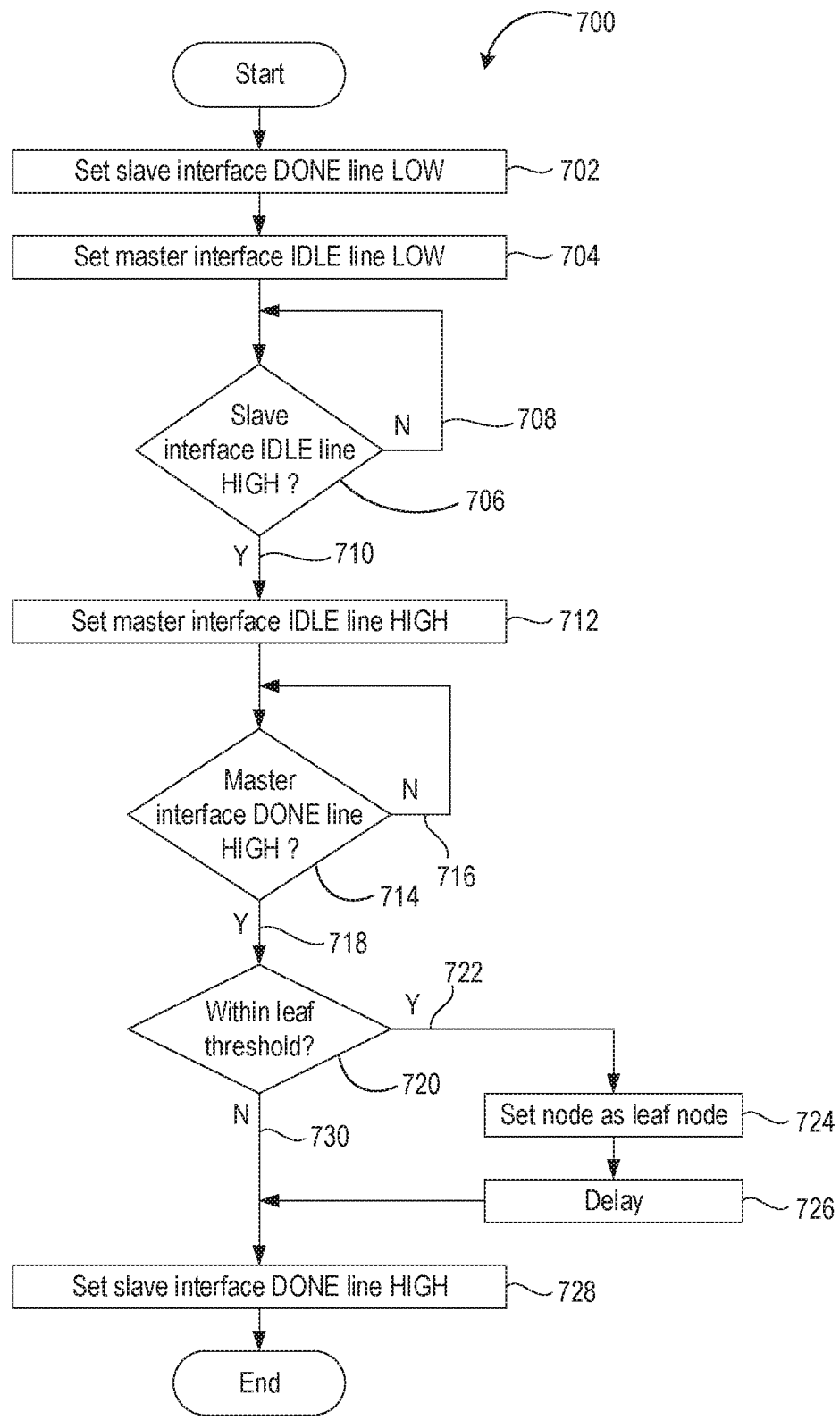
FIG. 7 illustrates a flow diagram for an example discovery phase, peripheral node process in accordance with some embodiments.
Figure 8:
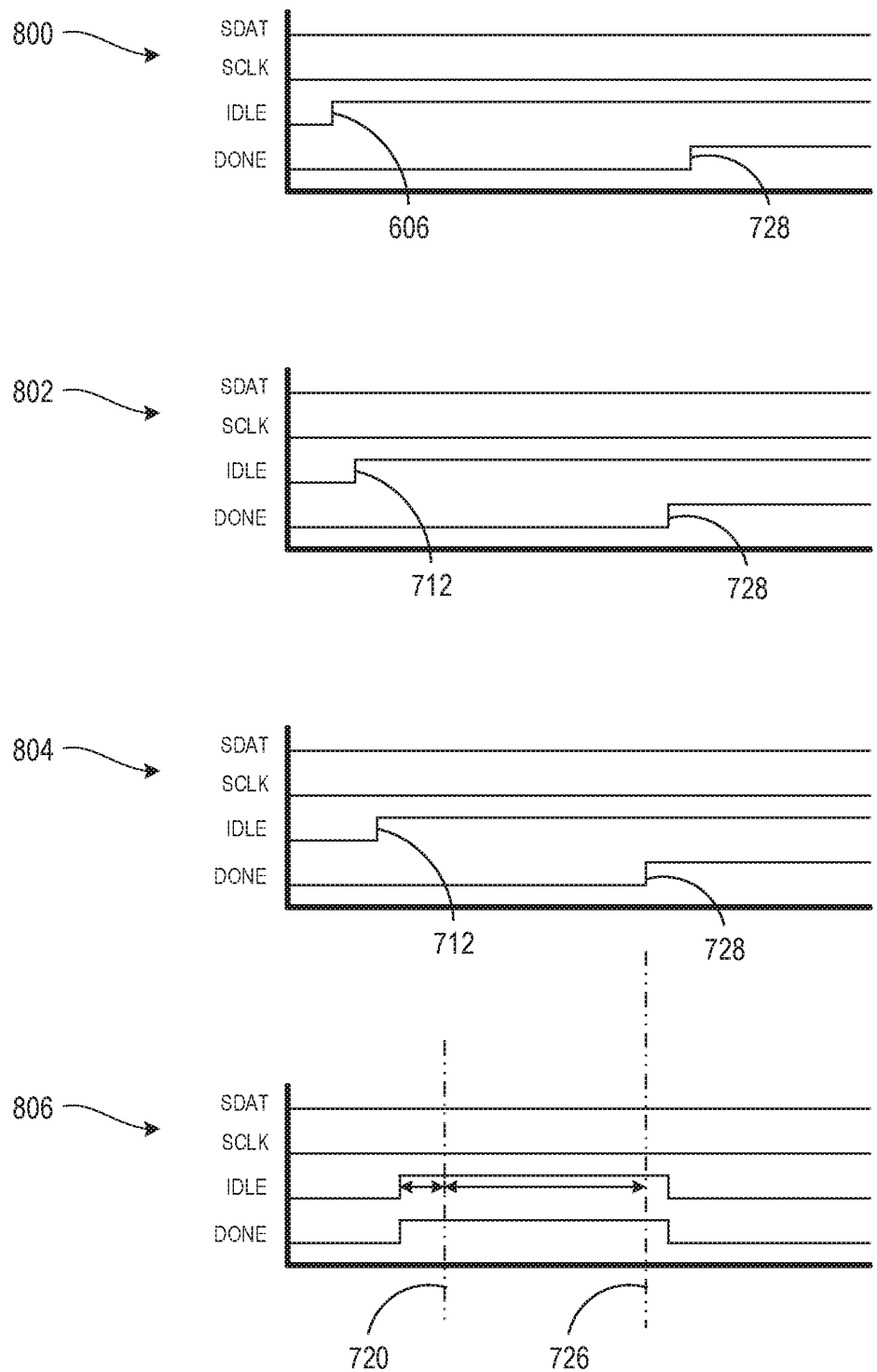
FIG. 8 illustrates exemplary schematic timing diagrams during the discovery phase in accordance with some embodiments.

Upon initial power-up of a system such as Nebula system 100 containing a plurality of peripheral nodes chained together via a Nebula bus network, a discovery phase and an enumeration phase are initiated to allow the devices in the chain to orientate themselves in the chain. Referring to FIGS. 6-8, the discovery phase will be discussed in the following paragraphs.

Since the peripheral nodes are not pre-programmed to know their position in the chain, the discovery phase allows each node to determine whether it is the last node in the chain. The commands issued from the Nebula chain controller 110 get transmitted to each node in the chain, and it is the responsibility of the last chain node to begin the Readback phase of a Nebula communication cycle. Nodes that are not the last node in the chain are controlled via the Nebula bus lines to know when it is their turn in the process. As used herein, the last node is referred to as the "leaf node", and the node identified as the leaf node will cause its leaf ID 132 to indicate this during the discovery phase.

FIG. 6 illustrates a flow diagram illustrating an example discovery phase controller process 600 according to some embodiments. Process 600 is preferably executed by Nebula chain controller 110. Alternatively, host controller 102 may execute process 600 via control of the Nebula master port 122 of Nebula chain controller 110. Process 600 is parenthetically referred to below.

FIG. 7 illustrates a flow diagram for an example discovery phase peripheral node process 700 according to some embodiments. Process 700 is preferably executed by communication interface logic 126. However, a processor or microcontroller separate from communication interface logic 126 may execute process 700. Process 700 is parenthetically referred to below.

FIG. 8 illustrates exemplary schematic timing diagrams during the discovery phase according to some embodiments. FIG. 8 includes a first timing diagram 800 corresponding with the first Nebula bus 112 between Nebula chain controller 110 and Nebula bus node 104. A second timing diagram 802 corresponds with Nebula bus 114 between Nebula nodes 104 and 106. A third timing diagram 804 corresponds with Nebula bus 116 between Nebula nodes 106 and 108, and a fourth timing diagram 806 corresponds with Nebula bus 118 between Nebula bus node 108 and Nebula bus terminator 120.

Upon power up of the Nebula system 100, Nebula chain controller 110 begins by setting the IDLE line 142 to a logic low signal level (602) via its Nebula master port 122. nodes 104, 106, 108 begin by setting the DONE line 144 of its Nebula slave port 124 (702) and the IDLE line 142 of its Nebula master port 122 (704) to logic low signal levels. Process 700 then causes nodes 104, 106, 108 to enter a wait state, checking whether the IDLE line 142 on their Nebula slave port 124 is a logic high signal level (706). To give nodes 104, 106, 108 some time to power up, configure themselves if necessary (e.g., if any given node is implemented as an FPGA), and to enter the wait state, Nebula chain controller 110 executes a delay (604) for a predetermined period of time.

Following the delay 604, process 600 causes Nebula chain controller 110 to set the IDLE line 142 of its Nebula master port 122 to a logic high signal level (606). By setting the IDLE line 142 high, Nebula chain controller 110 sets the chain of nodes in process to determine which is the leaf node.

In the wait mode 706, process 700 causes the respective node 104, 106, or 108 to scan the IDLE line 142 of its Nebula slave port 124 to determine when a logic high signal level is found. If the IDLE line 142 remains low (708), process 700 loops back to continue checking if the IDLE line 142 is yet at a logic high signal level. After process 700 determines that a logic high signal level is detected (710) on IDLE line 142, the Nebula master port 122 IDLE line 142 is commanded into a logic high state (712). Downstream nodes such as Nebula bus node 106 and 108 receive IDLE line logic high signal levels in their Nebula slave ports 124 from the upstream node (e.g., nodes 104 and 106, respectively) connected thereto across the respective bus 114, 116.

After the Nebula master port 122 IDLE line 142 is set to a logic high signal level in the respective node (104, 106, or 108), process 700 begins by checking the DONE line 144 on the Nebula master port 122 to determine when it becomes a logic high signal level (714). While the DONE line 144 remains at a logic low signal level (716), process 700 loops back to step 714 to keep checking. When a logic high signal level is detected at the DONE line 144 (718), a leaf threshold is checked 720 to see if the time that it took to detect the logic high signal level at the DONE line 144 is less than the leaf threshold. In some embodiments, the leaf threshold is based on a number of clock cycles such as 2 or three cycles of a clock internal to the node. In this manner, the upstream node does not have to provide clock signals on SCLK line 140 during the discovery phase.

Within the time is takes to reach the leaf threshold, the DONE line 144 on the Nebula master port 122 of the last node in the cycle will have a logic high signal level since this last node is connected to the Nebula bus terminator 120 that has a short between the IDLE and DONE lines 142, 144. Accordingly, when a node 104, 106, or 108 detects a logic high signal level within the leaf threshold time (722), it determines that it is the leaf node and sets (724) its leaf ID 132 to a value (e.g., 1) to identify that it is the leaf node. Accordingly, the leaf ID 132 is a flag set to identify the node 104, 106, or 108 as the last node in the system chain. The leaf node then enters a delay (726) to ensure that upstream nodes will not detect a logic high signal level on their respective master interface DONE lines 144 within the leaf threshold. After the delay (726), the leaf node sets the DONE line 144 on its Nebula slave port 124 to a logic high signal level (728).

After the leaf node (e.g., Nebula bus node 108) sets the DONE line 144 on its Nebula slave port 124 to a logic high signal level, the upstream connected node (e.g., Nebula bus node 106) will detect (714) the DONE line 144 on its Nebula master port 122 for a logic high signal level (718) and will then check if the elapsed time is within the leaf threshold (720). Since the leaf node delayed (726) setting its slave interface DONE line 144 to a logic high signal level, the upstream node will not determine that the elapsed time is within the leaf threshold (730) and will set its slave interface DONE line 144 to a logic high signal level without setting its leaf ID 132 to identify itself as a leaf node.

The chain of upstream nodes will continue to receive logic high signal levels via their master interface DONE lines 144 outside of the leaf threshold time, so they will merely set their slave interface DONE lines 144 to logic high signal levels to report back to the Nebula chain controller 110 that the leaf node has been identified.

Referring back to process 600, after the IDLE line is set to a logic high signal level, process 600 checks (608) to see if the DONE line 144 on the Nebula master port 122 of the Nebula chain controller 110 is at a logic high signal level. If not (610), an enumeration timer is checked to see whether it has expired (612). If the enumeration timer has not expired (614), process 600 returns to check (608) whether the DONE line 144 on the Nebula master port 122 of the Nebula chain controller 110 is at a logic high signal level. If the enumeration timer has expired (616), then an error flag is sent (618) to host controller 102 to identify that an error has occurred. Process 600 then ends.

When the DONE line 144 of the Nebula master port 122 of Nebula chain controller 110 is detected to be at a logic high signal level (620), then the discovery phase is determined to be successfully completed, and process 600 ends.

Following the discovery phase, host controller 102 or Nebula chain controller 110 may initiate an enumeration phase to cause the nodes in the chain to determine their position within the chain. Determining a node's position includes setting the node ID 130 in the respective node so that when Nebula communication packets are sent by the Nebula chain controller 110, instructions for the node may be determined from the SELECT field.

Figure 9:
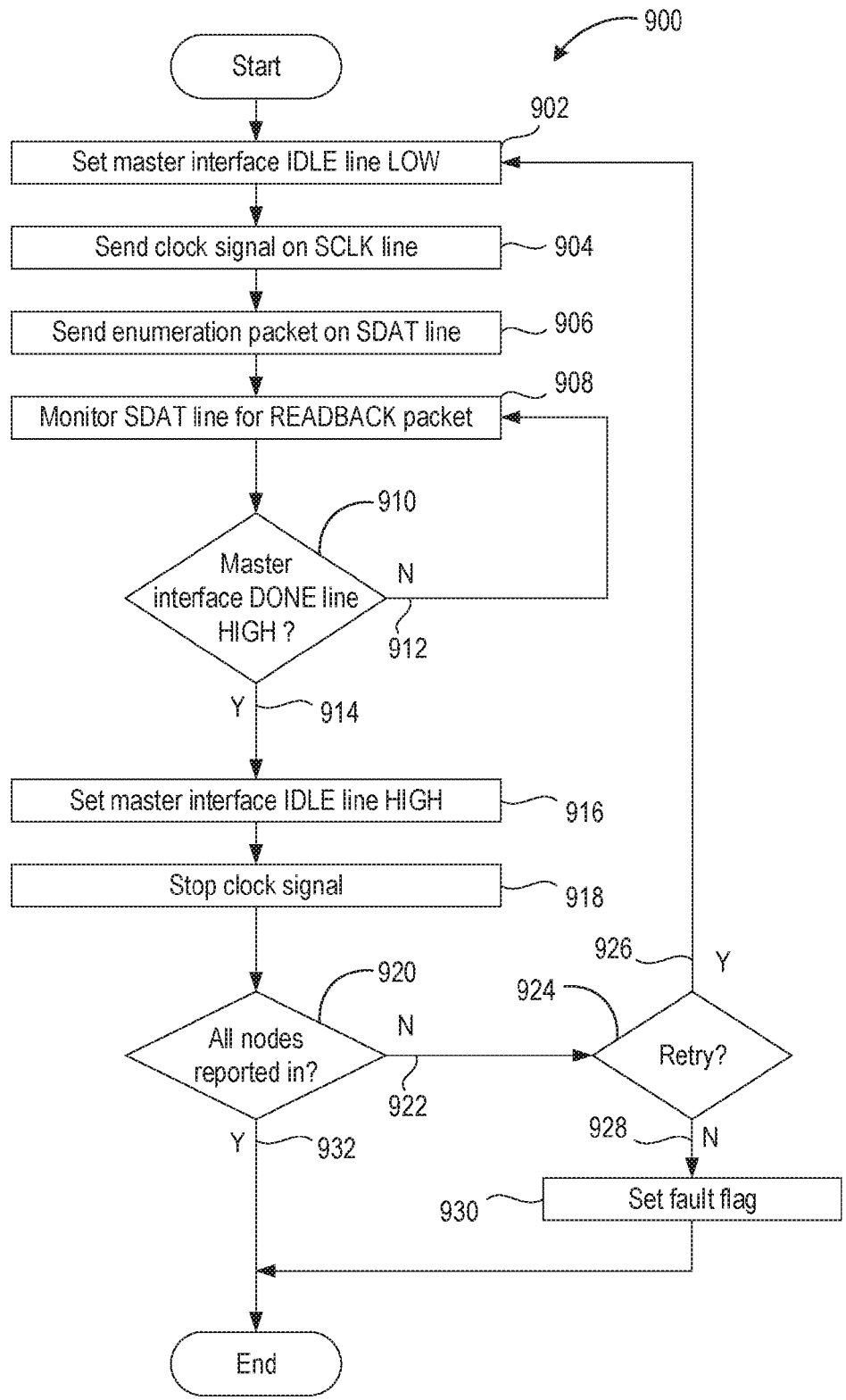
FIG. 9 illustrates a flow diagram showing an example enumeration phase, and controller process, executable by a master controller in accordance with some embodiments.

FIG. 9 illustrates a flow diagram for an example enumeration phase controller process 900 executable by the host controller 102 or Nebula chain controller 110 according to some embodiments. Process 900 is preferably executed by Nebula chain controller 110. Alternatively, host controller 102 may execute process 900 via control of the Nebula master port 122 of Nebula chain controller 110. Process 900 is parenthetically referred to below.

Process 900 begins by setting the IDLE line 142 of the Nebula master port 122 of Nebula chain controller 110 to a logic low signal level (902), which indicates to the downstream node that a Nebula communication cycle is initiated. During the Nebula communication cycle, a clock signal is sent (904) from the Nebula master port 122 side of each bus (e.g., 112-118) to the Nebula slave port 124 side via the SCLK line 140. The enumeration packet 152 is sent (906) from the Nebula master port 122 of Nebula chain controller 110 to the Nebula slave port 124 of the downstream node via the SDAT line 138.

During the enumeration phase, each node 104, 106, 108 sets its node ID 130 and reports back to the Nebula chain controller 110 that it has received the command to enumerate itself and that the enumeration was successful. Accordingly, process 900 includes monitoring (908) the SDAT line 138 to detect READBACK packets 154 from each node in the chain.

As discussed below, when the downstream node receives the logic low signal level via the IDLE line 142, it sets the DONE line 144 to a logic low signal level to indicate that is not idle and that the Nebula communication cycle is not yet terminated in the downstream node. As such, the Nebula chain controller 110 checks (910) the DONE line 144 via its Nebula master port 122 to determine whether the first node (e.g., Nebula bus node 104) is finished (i.e., in an idle state) with the Nebula communication cycle. While the first node 104 is not idle (912), process 900 continues to monitor (908) the SDAT line 138 for READBACK packets 154. During the enumeration phase, Nebula chain controller 110 should receive a READBACK packet 154 from each node in the chain. After the first node has set the DONE line 144 to a logic high signal level (914), Nebula chain controller 110 sets (916) the IDLE line 142 high to indicate completion of the Nebula communication cycle and stops (918) the clock signal on the SCLK line 140.

Process 900 may include determining (920) whether READBACK packets 154 have been received from all nodes and/or whether there are repeated or skipped ID values in the received READBACK packets 154. If so (922), this is a sign that the enumeration phase has failed. Nebula chain controller 110 may determine (924) the enumeration phase. If the enumeration phase should be retried (926), process 900 returns to step set chain controller IDLE low 902 to try the enumeration phase again. If the enumeration phase should not be retried (928) or after a predetermined number of attempts, a fault flag may be set (930) to let the host controller 102 know that the enumeration phase was not successful. After setting the fault flag (930) or after determining that all nodes have successfully reported back (932), process 900 ends.

Figure 10:
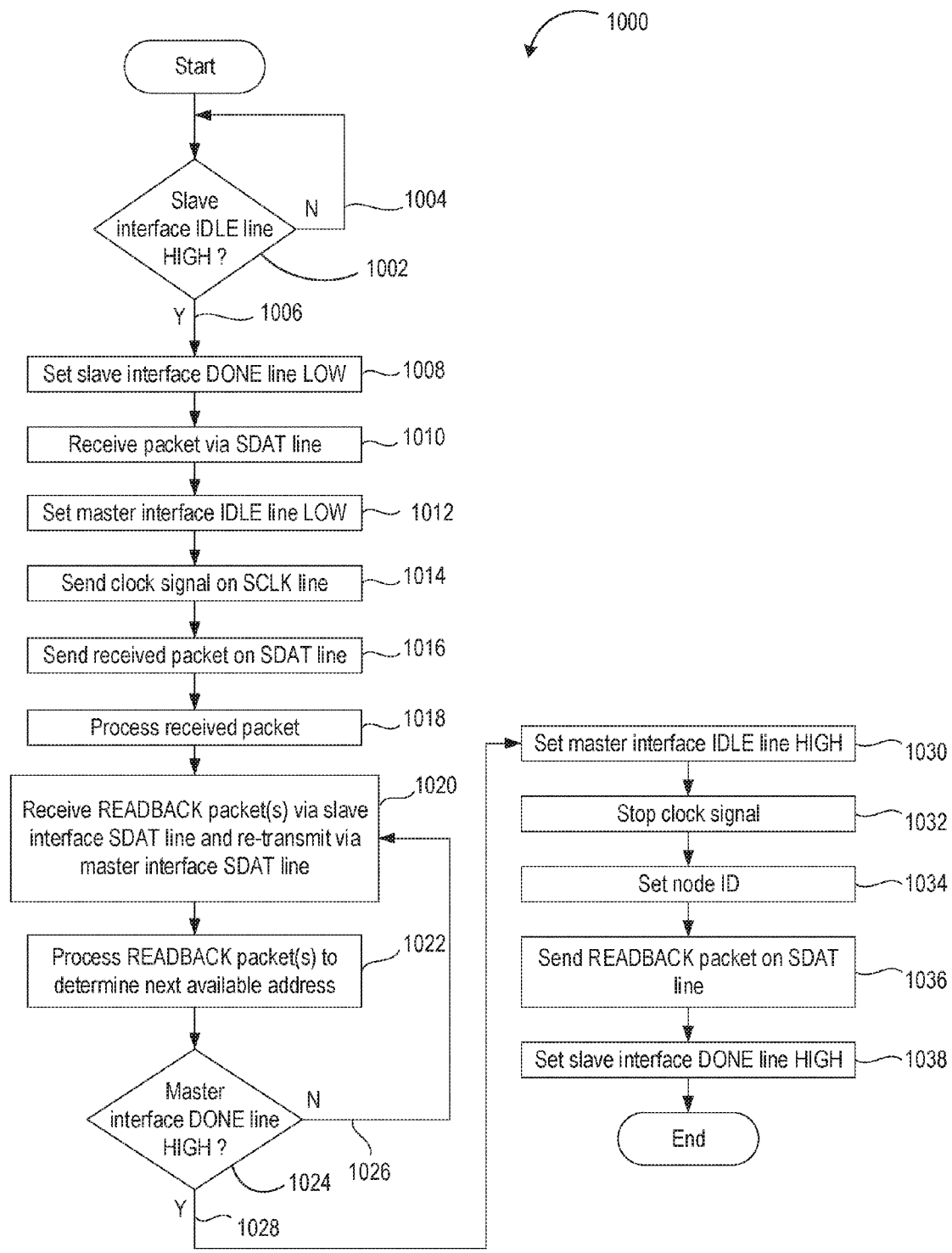
FIG. 10 illustrates a flow diagram illustrating an example enumeration phase, a peripheral node process, executable in a non-leaf peripheral device according to some embodiments.

FIG. 10 illustrates a flow diagram for an example enumeration phase peripheral node process 1000 executable in a non-leaf peripheral device according to some embodiments. Process 1000 is preferably executed by communication interface logic 126. However, a processor or microcontroller separate from communication interface logic 126 may execute process 1000. Process 1000 is parenthetically referred to below.

Process 1000 begins with the non-leaf peripheral nodes 104, 106 in an idle mode and includes determining (1002) whether the IDLE line 142 on its Nebula slave port 124 is at a logic high signal level. If the IDLE line 142 is at a logic low signal level (1004), then process 1000 returns to step 1002 to await a change in IDLE line 142 to go to a logic high signal level. When the IDLE line 142 is determined to be at a logic high signal level (1006), the DONE line 144 goes to the upstream node and sets (1008) to a logic low signal level to indicate to the upstream device that the peripheral node is not idle.

A Nebula communication packet is received (1010) via the SDAT line 138 on the Nebula slave port 124. In the case of an enumeration cycle, an enumeration packet 152 is received. Since the peripheral node executing process 1000 is not the leaf node, the IDLE line 142 of the Nebula master port 122 of the receiving peripheral node is set (1012) to a logic low signal level to let the downstream node know that a Nebula communication cycle has begun. The master interface port 122 SCLK line 140 is also controlled to send (1014) a clock signal to the downstream device, and the packet received on the SDAT line 138 on the Nebula master port 122 from the upstream device is further sent (1016) to the downstream device via the SDAT line 138 on the Nebula slave port 124.

The Nebula communication protocol includes an improvement in communication speed compared with prior art protocols for a chain of peripheral devices. To assist in increasing the speed of communications, portions of steps 1010 and 1012-1016 occur simultaneously. According to some embodiments, steps 1012-1016 are initiated within a few clock cycles of step 1010 and prior to having received the complete Nebula communication packet at step 1010. As such, the peripheral device can take advantage of at least a portion of the time it takes to receive the Nebula communication packet to send a copy of the Nebula communication packet further down the chain.

After the Nebula communication packet is received, it is processed (1018) to determine the communication instruction(s) contained in any of the COMMAND, SELECT, ADDRESS, or DATA fields. In the case of the enumeration packet 152, the non-leaf peripheral node is not configured to begin its response until the downstream node connected to it has terminated its part of the Nebula communication cycle. Until the downstream node is done, the peripheral node controlled by process 1000 is configured to monitor the SDAT line 138 on its Nebula master port 122 and to receive (1020) any downstream READBACK packet 154 to forward or transmit a copy of the received READBACK packet 154 to its upstream node via the SDAT line 138 on its Nebula slave port 124. To take advantage of the increased speed configured into the Nebula communication protocol, copies of the received READBACK packets 154 begin to be transmitted prior to receiving the complete READBACK packet 154 and preferably within two or three clock cycles after receiving the first bit of the READBACK packet 154.

In the enumeration phase, the peripheral nodes determine their position in the node chain by claiming the next available node ID. To find out which node IDs have already been claimed, process 1000 includes processing (1022) the SELECT field of the received READBACK packet(s) 154 to determine the next available node ID. As indicated above, in some embodiments, the leaf node claims the least significant bit as its node ID, and each successive peripheral node thereafter claims the next available node ID bit. After the last READBACK packet 154 is received from the downstream node, the peripheral node can claim the next available node ID bit.

The peripheral node continues to monitor (1024) the DONE line 144 on its Nebula master port 122 to determine whether the Nebula communication cycle has finished in the downstream node. While the DONE line 144 remains at a logic high signal level (1026), process 1000 returns to step 1020 to execute its process.

When the downstream device has signaled that it is idle and finished with the Nebula communication cycle, the DONE line 144 is set to a logic high signal level (1028), and the peripheral node sets (1030) the IDLE line 142 of the Nebula master port 122 to a logic high level and stops (1032) the clock signal on the SCLK line 140. The peripheral node then sets (1034) its node ID 130 to determine the next available node ID bit and transmits (1036) a READBACK packet 154 containing its node ID 130 to the upstream device via the SDAT line 138 on its Nebula slave port 124. Thereafter, process 1000 causes the peripheral node to set (1038) the DONE line 144 of its Nebula slave port 124 to a logic high signal level to indicate to the upstream node that it is idle and finished with the current Nebula communication cycle. Process 1000 then ends.

Figure 11:
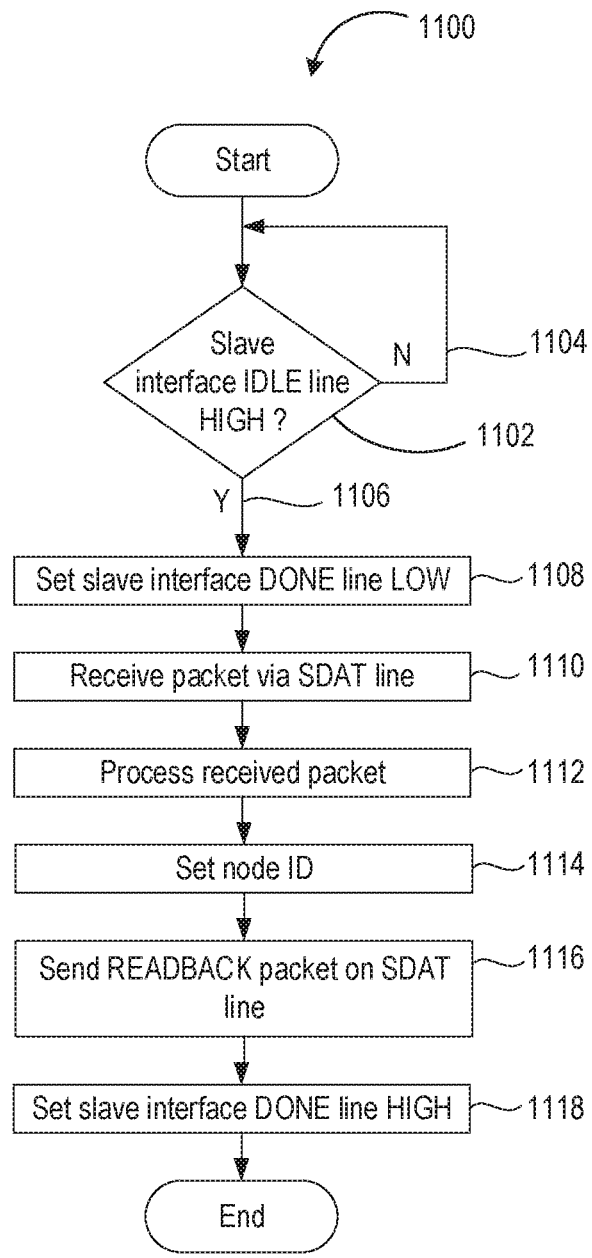
FIG. 11 illustrates a flow diagram illustrating an example enumeration phase, a peripheral node process, executable in a leaf peripheral device according to some embodiments.

FIG. 11 illustrates a flow diagram for an example enumeration phase peripheral node process 1100 executable in a leaf peripheral device according to some embodiments. Process 1100 is preferably executed by communication interface logic 126. However, a processor or microcontroller separate from communication interface logic 126 may execute process 1100. Process 1100 is parenthetically referred to below.

Process 1100 begins with the leaf peripheral node 108 in an idle mode and includes determining (1102) whether the IDLE line 142 on its Nebula slave port 124 is at a logic high signal level. If the IDLE line 142 is at a logic low signal level (1104), then process 1100 returns to step 1102 to await a change in IDLE line 142 to a logic high signal level. When the IDLE line 142 is determined to be at a logic high signal level (1106), the DONE line 144 to the upstream node is set (1108) to a logic low signal level to indicate to the upstream device that the peripheral node is not idle.

A Nebula communication packet is received (1110) via the SDAT line 138 on the Nebula slave port 124. In the case of an enumeration cycle, an enumeration packet 152 is received. Since the peripheral node executing process 1100 is the leaf node, Nebula master port 122 is not used to further communicate with received communication packets downstream.

Leaf peripheral node 108 processes (1112) to determine the communication instruction(s) contained in any of the COMMAND, SELECT, ADDRESS, or DATA fields. In the case of the enumeration packet 152, the leaf peripheral node 108 is configured to begin its response very soon after the communication instruction is received in the enumeration packet 152. In some embodiments, the response begins within two or three clock cycles after receiving the complete enumeration packet 152.

Since the leaf peripheral node 108 knows that it is the last peripheral node in the chain as determined during the discovery phase, the leaf peripheral node 108 can claim the first, least-significant bit in the SELECT field as its address and set (1114) its node ID 130 accordingly. After the leaf peripheral node 108 has determined its node ID 130, it begins sending the Readback stream back to the Nebula chain controller 110 by transmitting (1116) a READBACK packet 154 containing its node ID 130 to the upstream device 106 via the SDAT line 138 on its Nebula slave port 124. Thereafter, process 1100 causes the peripheral node to set (1118) the DONE line 144 of its Nebula slave port 124 to a logic high signal level to indicate to the upstream node 106 that it is idle and finished with the current Nebula communication cycle. Process 1100 then ends.

Figure 12:
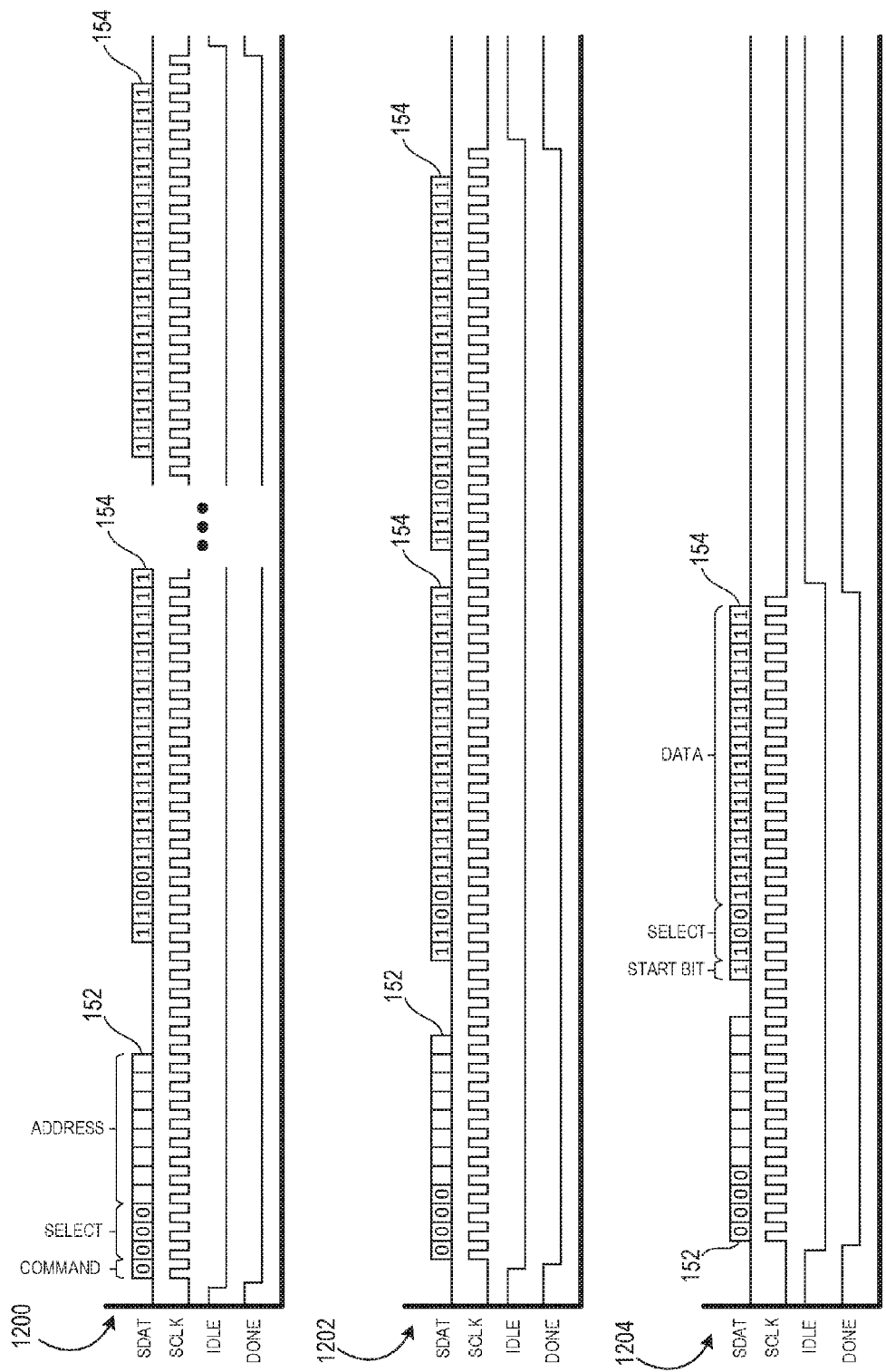
FIG. 12 illustrates exemplary schematic timing diagrams during the enumeration phase according to some embodiments.

FIG. 12 illustrates exemplary schematic timing diagrams during the enumeration phase according to some embodiments. FIG. 12 includes a first timing diagram 1200 corresponding with the first Nebula bus 112 between Nebula chain controller 110 and Nebula bus node 104. A second timing diagram 1202 corresponds with Nebula bus 114 between Nebula nodes 104 and 106. A third timing diagram 1204 corresponds with Nebula bus 116 between Nebula nodes 106 and 108.

Figure 13:
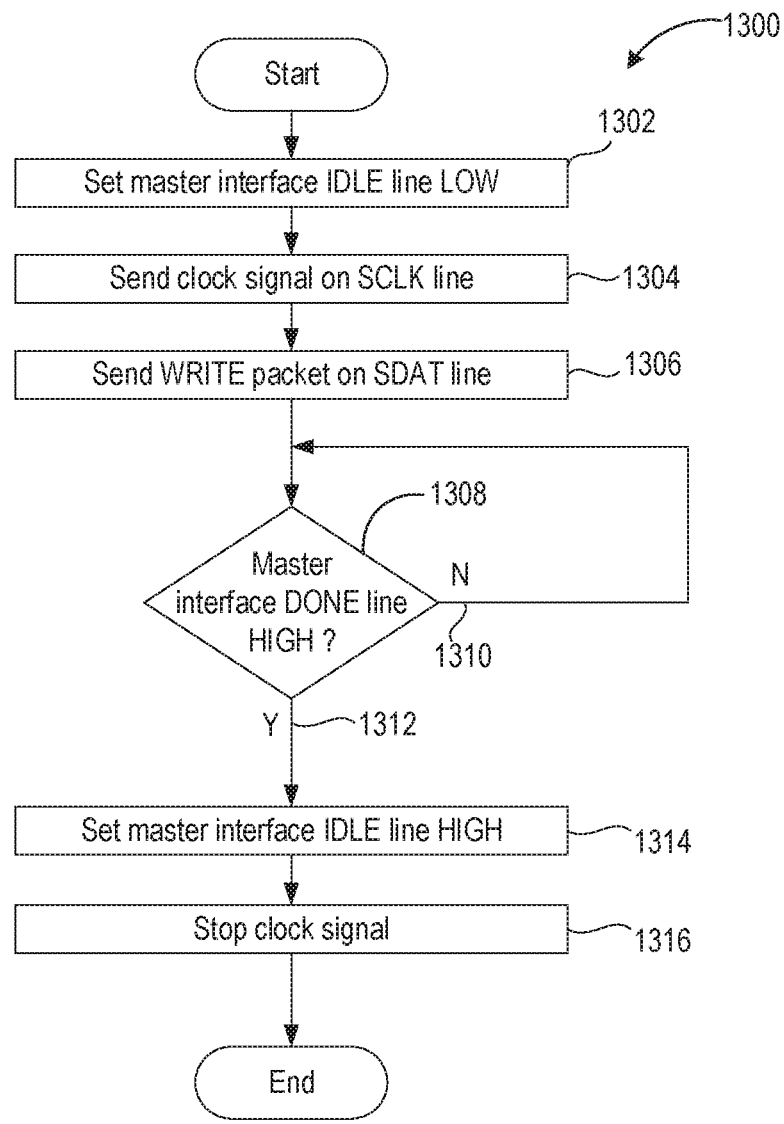
FIG. 13 illustrates a flow diagram for an example of a write phase, controller process, executable by a master controller in accordance with some embodiments.

FIG. 13 illustrates a flow diagram for an example write phase controller process 1300 executable by the host controller 102 or Nebula chain controller 110 according to some embodiments. Process 900 is preferably executed by Nebula chain controller 110. Alternatively, host controller 102 may execute process 900 via control of the Nebula master port 122 of Nebula chain controller 110. Process 900 is parenthetically referred to below.

Process 1300 begins by setting the IDLE line 142 of the Nebula master port 122 of Nebula chain controller 110 to a logic low signal level (1302), which indicates to the downstream node that a Nebula communication cycle is initiated. During the Nebula communication cycle, a clock signal is sent (1304) from the Nebula master port 122 side of each bus (e.g., 112-118) to the Nebula slave port 124 side via the SCLK line 140. A data write packet 146 is sent (1306) from the Nebula master port 122 of Nebula chain controller 110 to the Nebula slave port 124 of the downstream node via the SDAT line 138 to indicate which peripheral nodes 104-108 are commanded to write the data into the DATA field of the memory location identified in the ADDRESS field.

As discussed herein, when the downstream node receives the logic low signal level via the IDLE line 142, it sets the DONE line 144 to a logic low signal level to indicate that is not idle and that the Nebula communication cycle is not yet terminated in the downstream node. As such, the Nebula chain controller 110 checks (1308) the DONE line 144 via its Nebula master port 122 to determine whether the first node (e.g., Nebula bus node 104) is finished (i.e., in an idle state) with the Nebula communication cycle. While the first node 104 is not idle (1310), process 900 continues to monitor the DONE line 144, and the data write packet 146 is communicated from peripheral node to peripheral node as described herein until the leaf node 108 receives the communication packet. Since no data is requested to be returned to the Nebula chain controller 110 during a write phase, the DONE line 144 will be set to a logic high signal level without any Readback data being received from the peripheral nodes 104, 106, 108. After the first node has set the DONE line 144 to a logic high signal level (1312), Nebula chain controller 110 sets (1314) the IDLE line 142 high to indicate completion of the Nebula communication cycle and stops (1316) the clock signal on the SCLK line 140. Process 1300 then ends.

Figure 14:
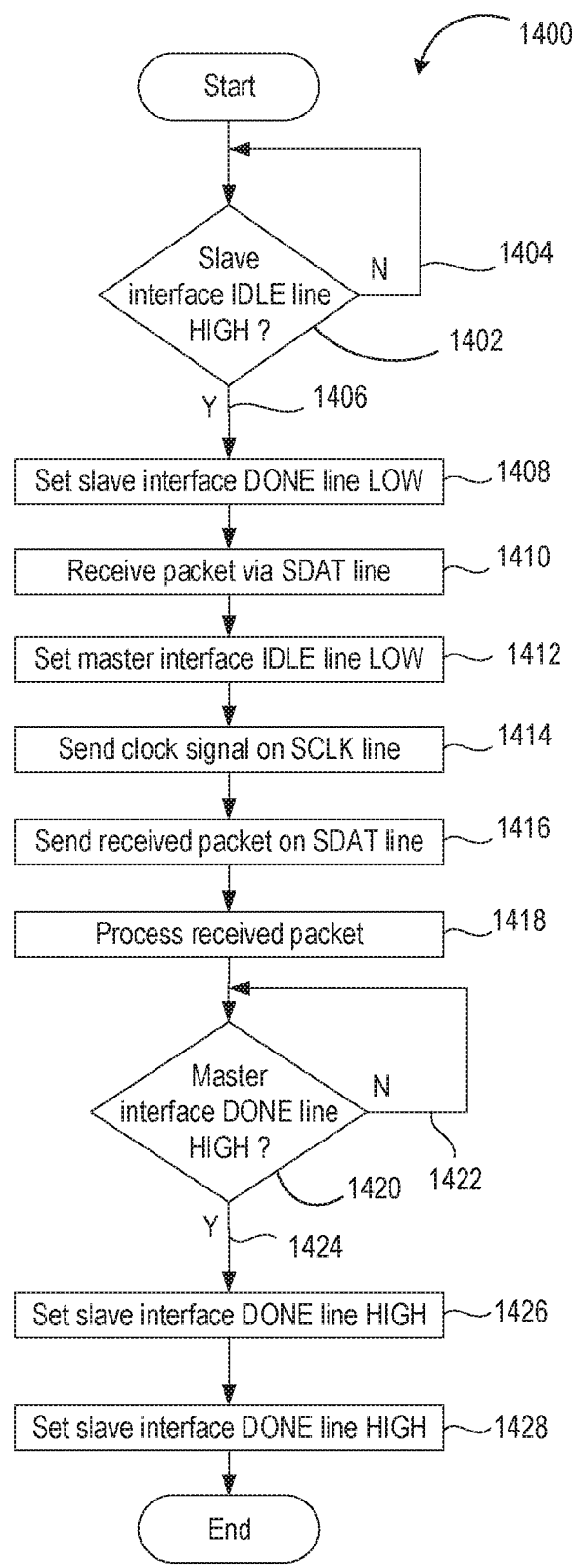
FIG. 14 illustrates a flow diagram for an example write phase, peripheral node process, executable in a non-leaf peripheral device in accordance with some embodiments.

FIG. 14 illustrates a flow diagram for an example write phase peripheral node process 1400 executable in a non-leaf peripheral device according to some embodiments. Process 1400 is preferably executed by communication interface logic 126. However, a processor or microcontroller separate from communication interface logic 126 may execute process 1400. Process 1400 is parenthetically referred to below.

Process 1400 begins with the non-leaf peripheral node 104, 106 in an idle mode and includes determining (1402) whether the IDLE line 142 on its Nebula slave port 124 is at a logic high signal level. If the IDLE line 142 is at a logic low signal level (1404), then process 1400 returns to step 1402 to await a change in IDLE line 142 to a logic high signal level. When the IDLE line 142 is determined to be at a logic high signal level (1406), the DONE line 144 to the upstream node is set (1408) to a logic low signal level to indicate to the upstream device that the peripheral node is not idle.

A data write packet 146 is received (1410) via the SDAT line 138 on the Nebula slave port 124. Since the peripheral node executing process 1400 is not the leaf node, the IDLE line 142 of the Nebula master port 122 of the receiving peripheral node is set (1412) to a logic low signal level to let the downstream node know that a Nebula communication cycle has begun. The master interface port 122 SCLK line 140 is also controlled to send (1414) a clock signal to the downstream device. The packet received on the SDAT line 138 on the Nebula master port 122 from the upstream device is further sent (1416) to the downstream device via the SDAT line 138 of the Nebula slave port 124.

After the Nebula communication packet is received, it is processed (1418) to determine the communication instruction(s) contained in any of the COMMAND, SELECT, ADDRESS, or DATA fields. In the case of a data write packet 146, the non-leaf peripheral node is configured to store the data contained in the DATA field to the memory location in the ADDRESS field.

In one embodiment, the received Nebula communication packet contains an instruction configured to be carried out by each of the nodes 104, 106, 108 substantially simultaneously. Since upstream nodes receive the instructions prior to downstream nodes, the execution of the instruction may be delayed in order to allow the instruction to be received in each node 104, 106, 108. The period for the delay may be determined in each node 104, 106, 108 based on a predetermined number on clock cycles (e.g., two or three clock cycles) and based on the position of the node 104, 106, 108 in the chain. For example, using the node ID 130, node 104 may determine the delay based on its position being the third node such that the delay for node 104 results in 6 clock cycles (i.e., position 3 multiplied by 2 clock cycles) from the end of receiving the instructions. Node 106 may determine the delay to be 4 clock cycles (i.e., position 2 multiplied by 2 clock cycles), and node 108 may determine the delay to be 2 clock cycles (i.e., position 1 multiplied by 2 clock cycles). Accordingly, each node 104, 106, 108 can execute the received instruction(s) substantially simultaneously.

Following processing (1418) of the received Nebula communication packet, since no upstream response is necessary, peripheral node 104, 106 monitors (1420) the DONE line 144 on its Nebula master port 122 to determine whether the Nebula communication cycle has finished at the downstream node. While the DONE line 144 remains at a logic high signal level (1422), process 1400 returns to step 1420 to execute its process.

When the downstream device has signaled that it is idle and finished with the Nebula communication cycle by setting the DONE line 144 to a logic high signal level (1424), it sets (1426) the DONE line 144 of its Nebula slave port 124 to a logic high signal level to indicate to the upstream node that it is idle and finished with the current Nebula communication cycle and stops (1428) the clock signal on the SCLK line 140. Process 1400 then ends.

Process 1400 takes advantage of the same speed advantages discussed herein. As such, portions of the steps related to receiving data on the SDAT line 138 at one of the master or slave ports 122, 124 occur simultaneously with the steps of transmitting a copy of the received data to the other master or slave ports 122, 124.

Figure 15:
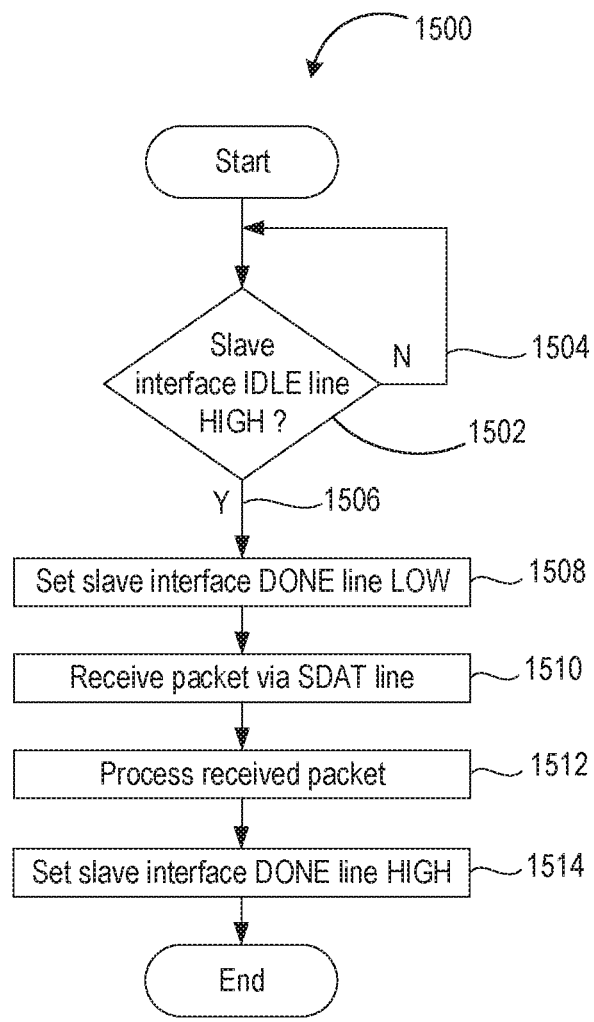
FIG. 15 illustrates a flow diagram for an example enumeration phase, peripheral node process, executable in a leaf peripheral device in accordance with some embodiments.

FIG. 15 illustrates a flow diagram illustrating an example enumeration phase peripheral node process 1500 executable in a leaf peripheral device according to some embodiments. Process 1500 is preferably executed by communication interface logic 126. However, a processor or microcontroller separate from communication interface logic 126 may execute process 1500. Process 1500 is parenthetically referred to below.

Process 1500 begins with the leaf peripheral node 108 in an idle mode. It includes determining (1502) whether the IDLE line 142 on its Nebula slave port 124 is at a logic high signal level. If the IDLE line 142 is at a logic low signal level (1504), then process 1500 returns to step 1102 to await a change in IDLE line 142 to a logic high signal level. When the IDLE line 142 is determined to be at a logic high signal level (1506), the DONE line 144 to the upstream node is set (1508) to a logic low signal level to indicate to the upstream device that the peripheral node is not idle.

A Nebula communication packet is received (1510) via the SDAT line 138 on the Nebula slave port 124. In the case of an enumeration cycle, an enumeration packet 152 is received. Since the peripheral node executing process 1500 is the leaf node, Nebula master port 122 is not used to further communicate received communication packets downstream.

Leaf peripheral node 108 processes received packet (1512) to determine the communication instruction(s) contained in any of the COMMAND, SELECT, ADDRESS, or DATA fields. In the case of a data write packet 146, the leaf peripheral node 108 is configured to store the DATA field in memory according to the ADDRESS field location.

Since the leaf peripheral node 108 knows that it is the last peripheral node in the chain as determined during the discovery phase, the leaf peripheral node 108 can set (1514) the DONE line 144 of its Nebula slave port 124 to a logic high signal level. This will indicate to the upstream node 106 that it is idle and finished with the current Nebula communication cycle. This indicative timing process completes within two or three clock cycles after receiving the complete data write packet 146. Process 1500 then ends.

Figure 16:
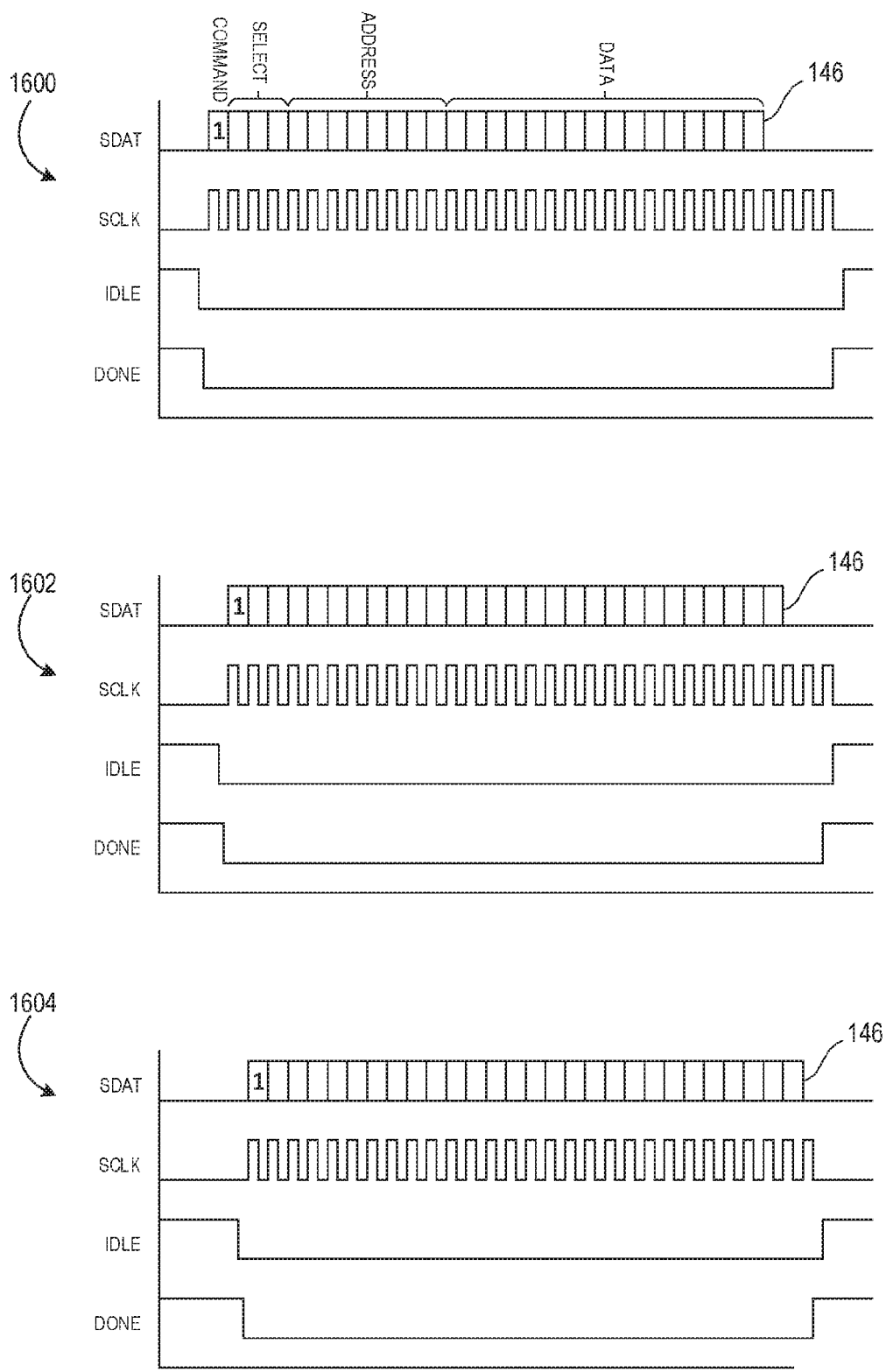
FIG. 16 illustrates exemplary schematic timing diagrams during the data write phase, according to some embodiments.

FIG. 16 illustrates exemplary schematic timing diagrams during the data write phase according to some embodiments. FIG. 16 includes a first timing diagram 1600 corresponding with the first Nebula bus 112 between Nebula chain controller 110 and Nebula bus node 104. A second timing diagram 1602 corresponds with Nebula bus 114 between Nebula nodes 104 and 106. A third timing diagram 1604 corresponds with Nebula bus 116 between Nebula nodes 106 and 108.

Figure 17:
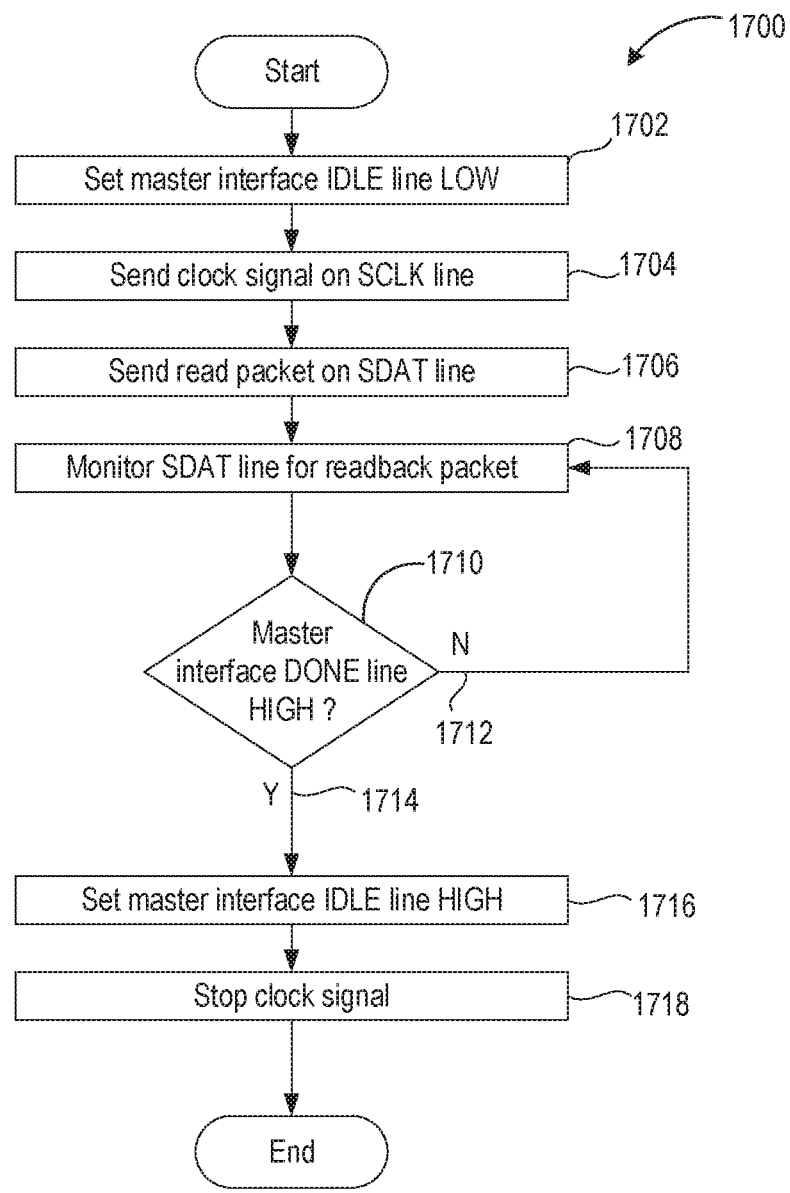
FIG. 17 illustrates a flow diagram for an example read phase, controller process, executable by a master controller in accordance with some embodiments.

FIG. 17 illustrates a flow diagram illustrating an example read phase controller process 1700 executable by the host controller 102 or Nebula chain controller 110 according to some embodiments. Process 1700 is preferably executed by Nebula chain controller 110. Alternatively, host controller 102 may execute process 1700 via control of the Nebula master port 122 of Nebula chain controller 110. Process 1700 is parenthetically referred to below.

Process 1700 begins by setting the IDLE line 142 of the Nebula master port 122 of Nebula chain controller 110 to a logic low signal level (1702), which indicates to the downstream node that a Nebula communication cycle is initiated. During the Nebula communication cycle, a clock signal is sent (1704) from the Nebula master port 122 side of each bus (e.g., 112-118) to the Nebula slave port 124 side via the SCLK line 140. The data read packet 148 is sent (1706) from the Nebula master port 122 of Nebula chain controller 110 to the Nebula slave port 124 of the downstream node via the SDAT line 138.

During the read phase, nodes 104, 106, 108 selected via the SELECT field report their memory data at the memory address identified by the ADDRESS field back to the Nebula chain controller 110. Accordingly, process 1700 includes monitoring (1708) the SDAT line 138 to detect any READBACK packets 154 from downstream nodes in the chain.

As discussed herein, when the downstream node receives the logic low signal level via the IDLE line 142, it sets the DONE line 144 to a logic low signal level to indicate that is not idle and that the Nebula communication cycle is not yet terminated in the downstream node. As such, the Nebula chain controller 110 checks (1710) the DONE line 144 via its Nebula master port 122 to determine whether the first node (e.g., Nebula bus node 104) is finished (i.e., in an idle state) with the Nebula communication cycle. While the first node 104 is not idle (1712), process 1700 continues to monitor (1708) the SDAT line 138 for READBACK packets 154. During the read phase, Nebula chain controller 110 should receive a READBACK packet 154 from each selected node in the chain. After the first node has set the DONE line 144 to a logic high signal level (1714), Nebula chain controller 110 sets (1716) the IDLE line 142 high to indicate completion of the Nebula communication cycle and stops (1718) the clock signal on the SCLK line 140. Process 1700 thereafter ends.

Figure 18:
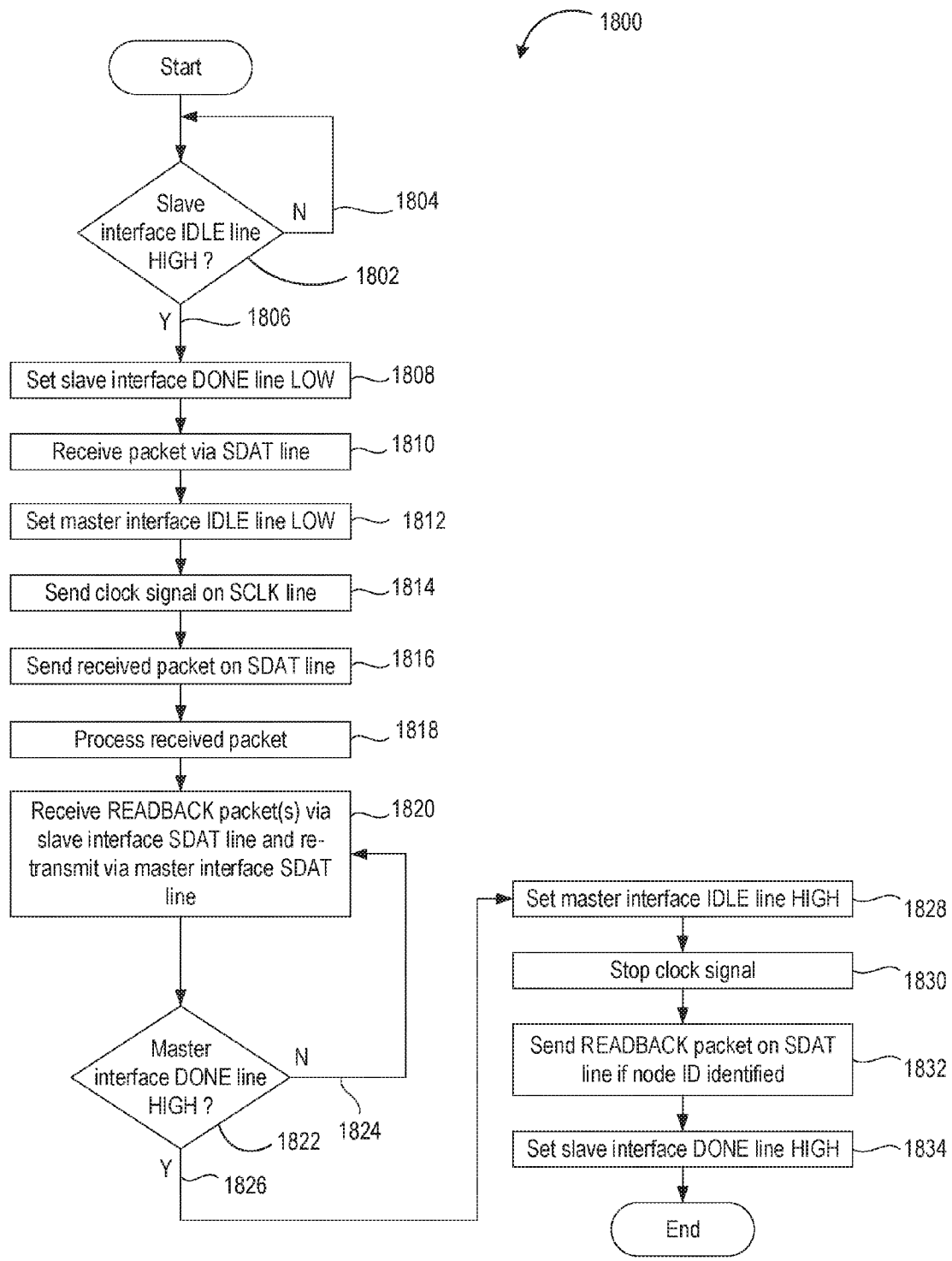
FIG. 18 illustrates a flow diagram for an example read phase, peripheral node process, executable in a non-leaf peripheral device in accordance with some embodiments.

FIG. 18 illustrates a flow diagram for an example read phase peripheral node process 1800 executable in a non-leaf peripheral device according to some embodiments. Process 1800 is preferably executed by communication interface logic 126. However, a processor or microcontroller separate from communication interface logic 126 may execute process 1800. Process 1800 is parenthetically referred to below.

Process 1800 begins with the non-leaf peripheral node 104, 106 in an idle mode and includes determining (1802) whether the IDLE line 142 on its Nebula slave port 124 is at a logic high signal level. If the IDLE line 142 is at a logic low signal level (1804), then process 1800 returns to step 1802 to await a change in IDLE line 142 to a logic high signal level. When the IDLE line 142 is determined to be at a logic high signal level (1806), the DONE line 144 to the upstream node is set (1808) to a logic low signal level to indicate to the upstream device that the peripheral node is not idle.

A Nebula communication packet is received (1810) via the SDAT line 138 on the Nebula slave port 124. In the case of a data read cycle, a data read packet 148 is received. Since the peripheral node executing process 1800 is not the leaf node, the IDLE line 142 of the Nebula master port 122 of the receiving peripheral node is set (1812) to a logic low signal level to let the downstream node know that a Nebula communication cycle has begun. The master interface port 122 SCLK line 140 is also controlled to send (1814) a clock signal to the downstream device, and the packet received on the SDAT line 138 on the Nebula master port 122 from the upstream device is further sent (1816) to the downstream device via the SDAT line 138 on the Nebula slave port 124.

After the Nebula communication packet is received, it is processed (1818) to determine the communication instruction(s) contained in any of the COMMAND, SELECT, ADDRESS, or DATA fields. In this process case, the data read packet 148 of the non-leaf peripheral node is not configured to begin its response until the downstream node connected to it has terminated its part of the Nebula communication cycle. Until the downstream node activity is done, the peripheral node controlled by process 1800 is configured to monitor the SDAT line 138 on its Nebula master port 122 to receive (1820) any downstream READBACK packet(s) 154 and to forward or re-transmit a copy of the received READBACK packet(s) 154 to its upstream node via the SDAT line 138 on its Nebula slave port 124.

The peripheral node continues to monitor (1822) the DONE line 144 on its Nebula master port 122 to determine whether the Nebula communication cycle has finished with the downstream node process. While the DONE line 144 remains at a logic low signal level (1824), process 1800 returns to step 1820 to execute its process.

When the downstream device has signaled that it is idle and finished with the Nebula communication cycle by setting the DONE line 144 to a logic high signal level (1826), the peripheral node sets (1828) the IDLE line 142 of the Nebula master port 122 to a logic high level and stops (1830) the clock signal on the SCLK line 140. Then, if the peripheral node ID is identified by the SELECT field of the upstream data read packet 148, the peripheral node transmits (1832) a READBACK packet 154 containing its node ID 130 and the memory information to the ADDRESS field location of the upstream device via the SDAT line 138 on its Nebula slave port 124. Thereafter, process 1800 causes the peripheral node to set (1834) the DONE line 144 of its Nebula slave port 124 to a logic high signal level to indicate to the upstream node that it is idle and finished with the current Nebula communication cycle. Process 1800 then ends.

Process 1800 takes advantage of the same speed advantages discussed herein. As such, portions of the steps related to receiving data on the SDAT line 138 of one of the master or slave ports 122, 124 occur simultaneously with the steps of transmitting a copy of the received data on the other of the master or slave ports 122, 124.

Figure 19:
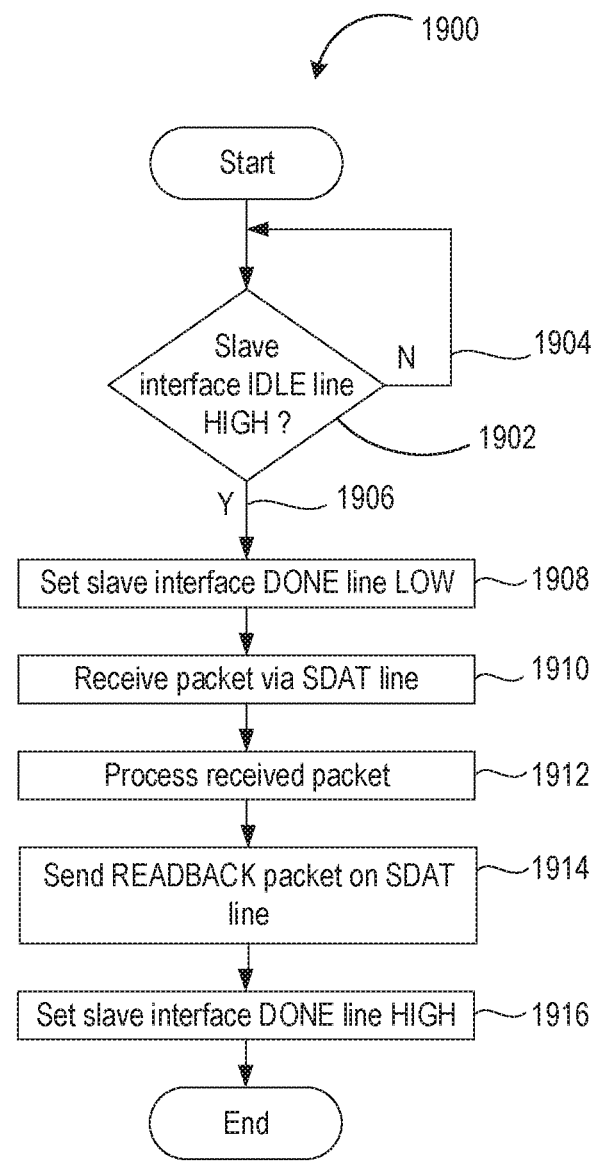
FIG. 19 illustrates a flow diagram for an example read phase, peripheral node process, executable in a leaf peripheral device in accordance with some embodiments.

FIG. 19 illustrates a flow diagram illustrating an example read phase peripheral node process 1900 executable in a leaf peripheral device according to some embodiments. Process 1900 is preferably executed by communication interface logic 126. However, a processor or microcontroller separate from communication interface logic 126 may execute process 1900. Process 1900 is parenthetically referred to below.

Process 1900 begins with the leaf peripheral node 108 in an idle mode and includes determining (1902) whether the IDLE line 142 on its Nebula slave port 124 is at a logic high signal level. If the IDLE line 142 is at a logic low signal level (1904), then process 1900 returns to step 1902 to await a change in IDLE line 142 to a logic high signal level. When the IDLE line 142 is determined to be at a logic high signal level (1906), the DONE line 144 to the upstream node is set (1908) to a logic low signal level to indicate to the upstream device that the peripheral node is not idle.

A Nebula communication packet is received (1910) via the SDAT line 138 on the Nebula slave port 124. In the case of a data read cycle, a data read packet 148 is received. Since the peripheral node executing process 1900 is the leaf node, Nebula master port 122 is not used to further communicate received communication packets downstream.

Leaf peripheral node 108 processes (1912) to determine the communication instruction(s) contained in any of the COMMAND, SELECT, ADDRESS, or DATA fields. In the case of the data read packet 148, the leaf peripheral node 108 is configured to begin its response very soon after the communication instruction is received in the data read packet 148. In some embodiments, the response begins within two or three clock cycles after the complete enumeration packet is received.

The response begins by sending the Readback stream back to the Nebula chain controller 110. In the case where the leaf node 108 is selected by the SELECT field, a READBACK packet 154 is transmitted (1914) containing its node ID 130 and the memory information at the ADDRESS field location to the upstream device 106 via the SDAT line 138 on its Nebula slave port 124. Thereafter, process 1900 causes the peripheral node to set (1916) the DONE line 144 of its Nebula slave port 124 to a logic high signal level to indicate to the upstream node 106 that it is idle and finished with the current Nebula communication cycle. In the case where the leaf node 108 is not selected, the response includes just the setting (1916) of the DONE line 144 to a logic high signal level. Process 1900 then ends.

Figure 20:
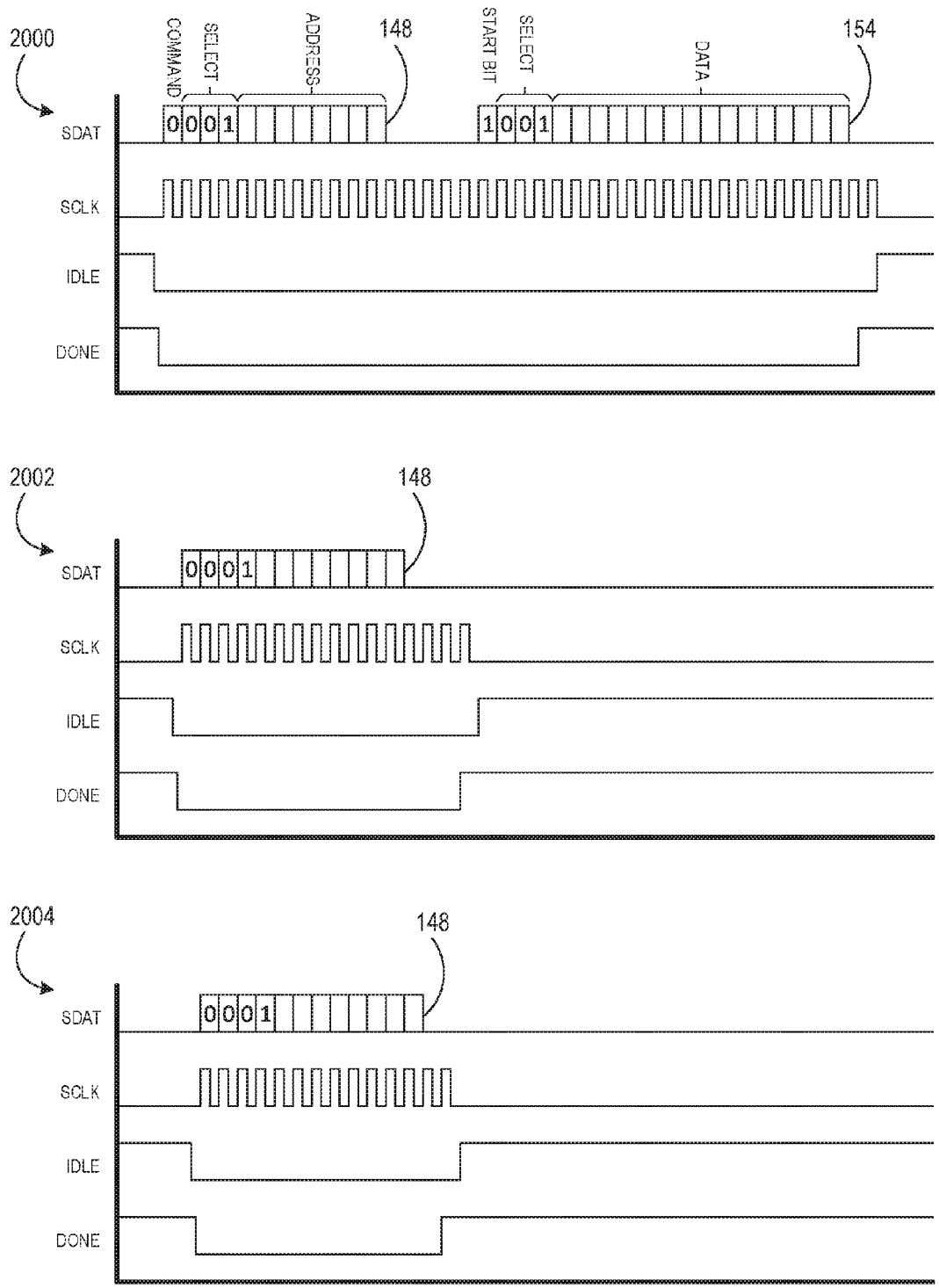
FIG. 20 illustrates exemplary schematic timing diagrams during the data read phase, according to some embodiments.

FIG. 20 illustrates exemplary schematic timing diagrams during the data read phase according to some embodiments. FIG. 20 includes a first timing diagram 2000 corresponding with the first Nebula bus 112 between Nebula chain controller 110 and Nebula bus node 104. A second timing diagram 2002 corresponds with Nebula bus 114 between Nebula nodes 104 and 106. A third timing diagram 2004 corresponds with Nebula bus 116 between Nebula nodes 106 and 108. As shown in FIG. 20, the data read packet 148 has selected the first node 104 as the only node to send memory data. Accordingly, the SDAT lines 138 corresponding to the Nebula busses 114, 116 do not indicate the sending of any READBACK packets 154 to upstream nodes.

Figure 21:
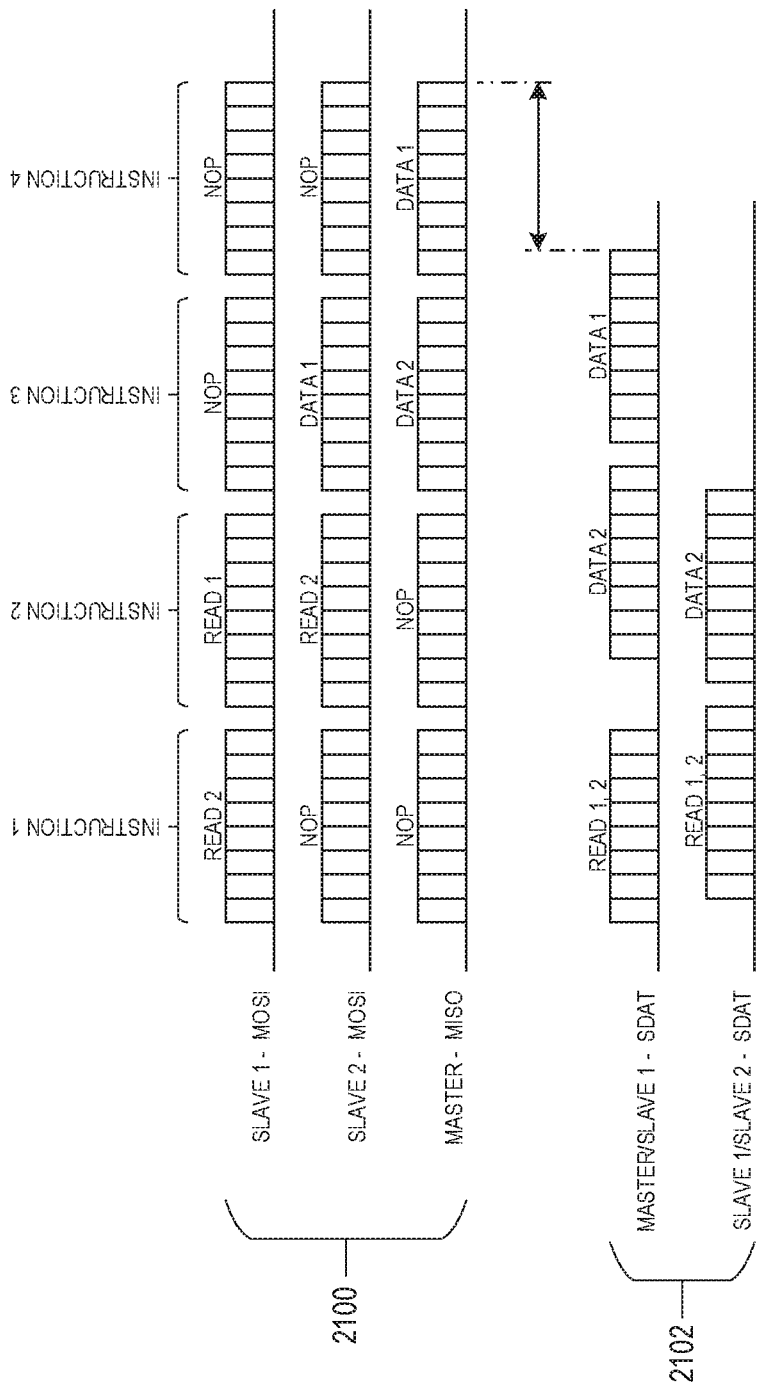
FIGS. 21 and 22 illustrate simulated mockup timing diagrams of the prior art SPI bus protocol, and the communication bus protocol described herein in accordance with some embodiments.
Figure 22:
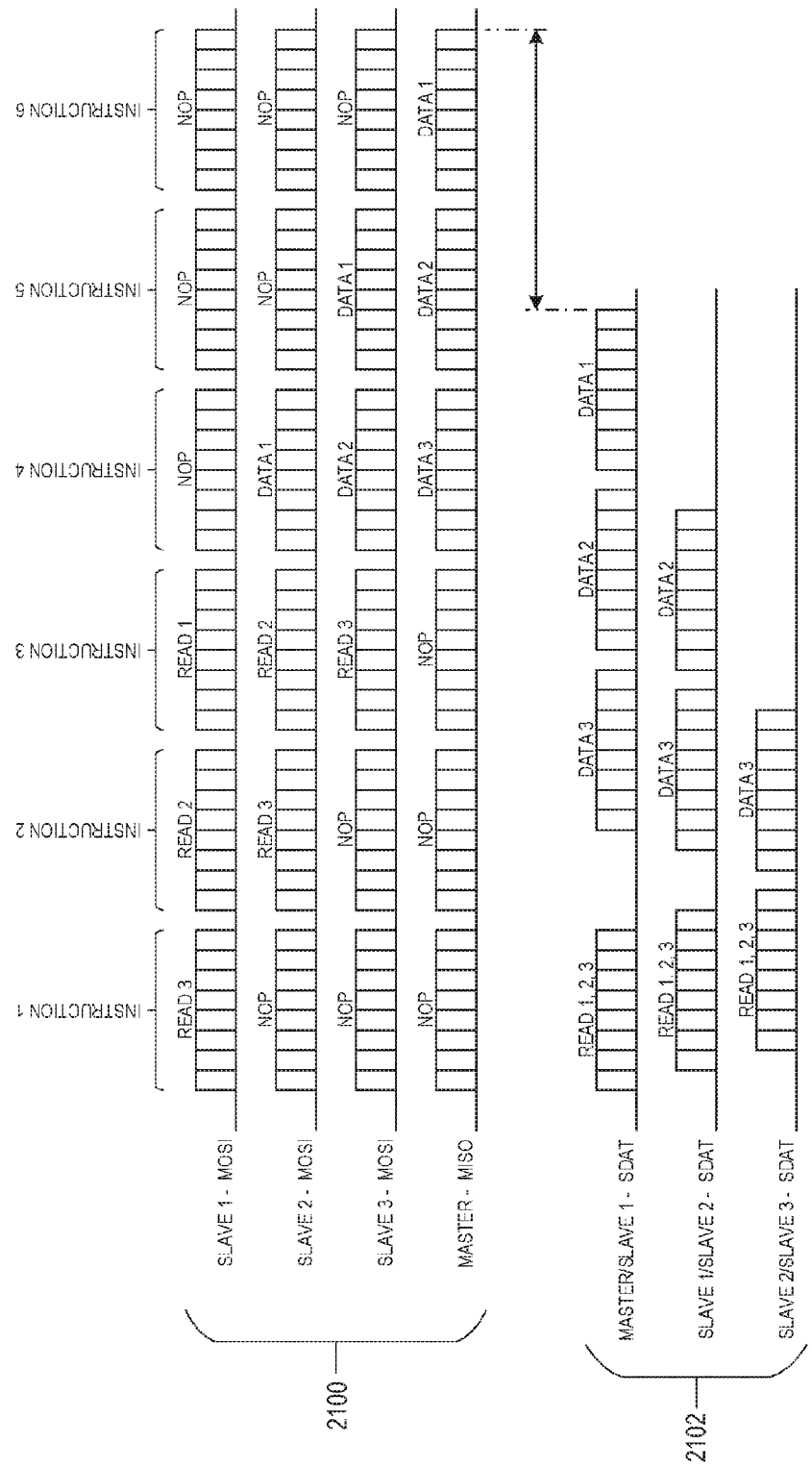

FIGS. 21 and 22 illustrate simulated mockup timing diagrams showing sample communications using the prior art SPI bus protocol 2100 and the Nebula communication bus protocol 2102 described herein. FIGS. 21 and 22 show 8-bit communications to peripheral/slave devices connected in a chained configuration to receive similar types of 8-bit information from two slave devices or three slave devices, respectively. As shown in FIG. 21, a shorter communication cycle is experienced with just two slave devices in the chain by the Nebula communication protocol versus the SPI bus protocol. An even larger time savings is experienced when receiving data from three chained slave devices (FIG. 22).

Figure 23:
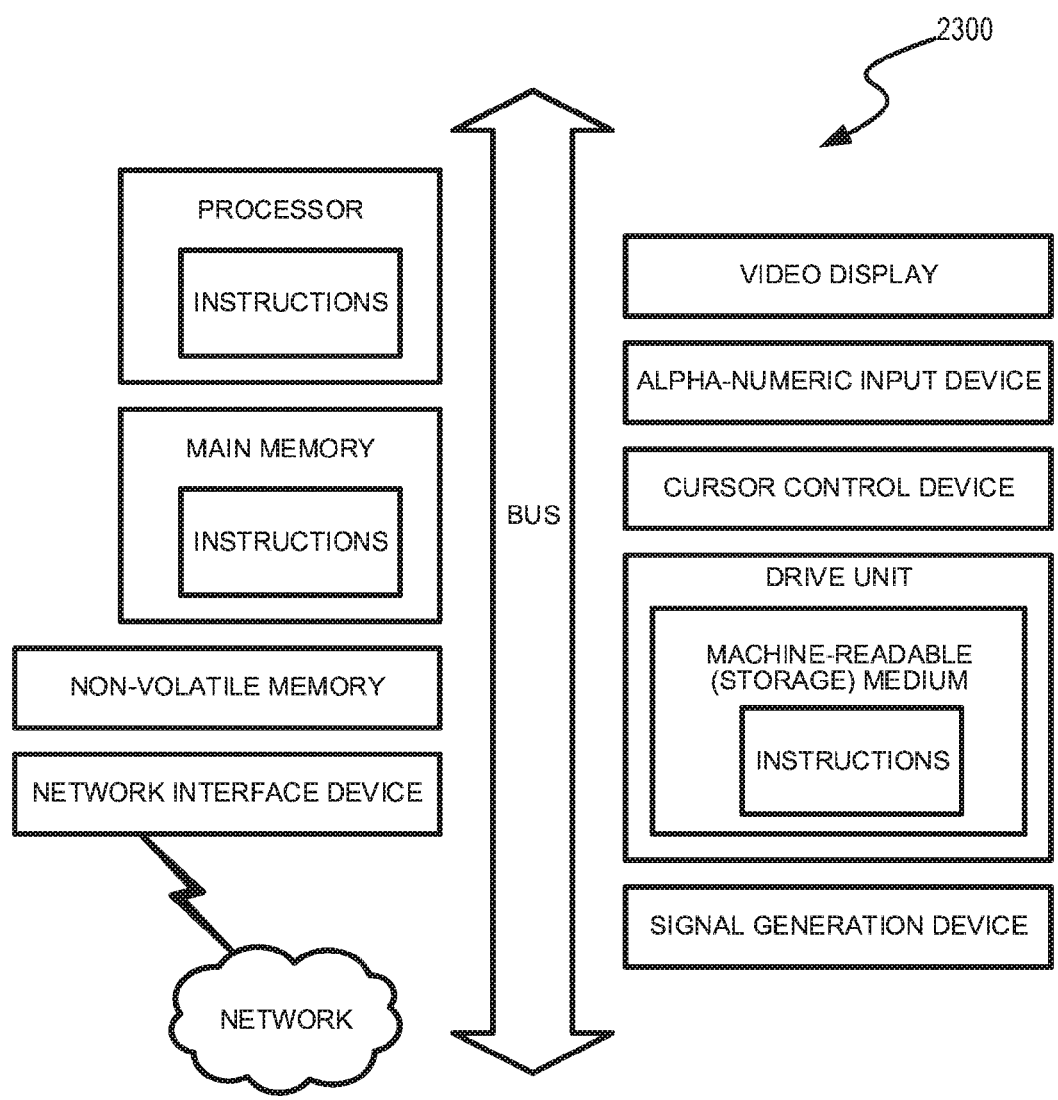
FIG. 23 illustrates a diagrammatic representation of a machine, in the example form, of a computer system within which a set of instructions, for causing the machine to perform any one or more of the methodologies discussed herein, may be executed.

FIG. 23 depicts a diagrammatic representation of a machine, in the example form, of a computer system 2300 within which a set of instructions, for causing the machine to perform any one or more of the methodologies discussed herein, may be executed.

Figure 1B:
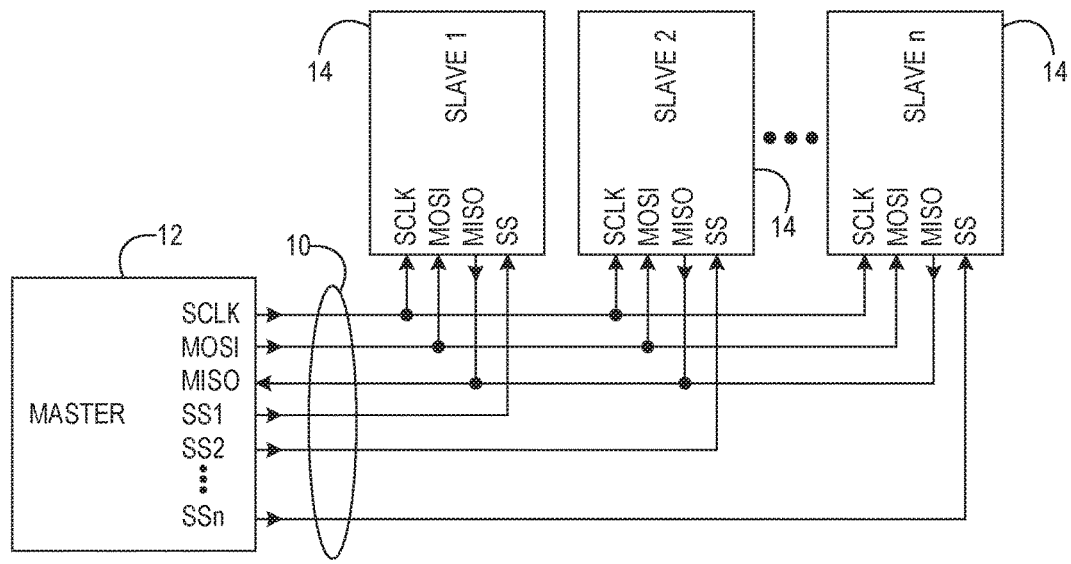
Figure 1C:
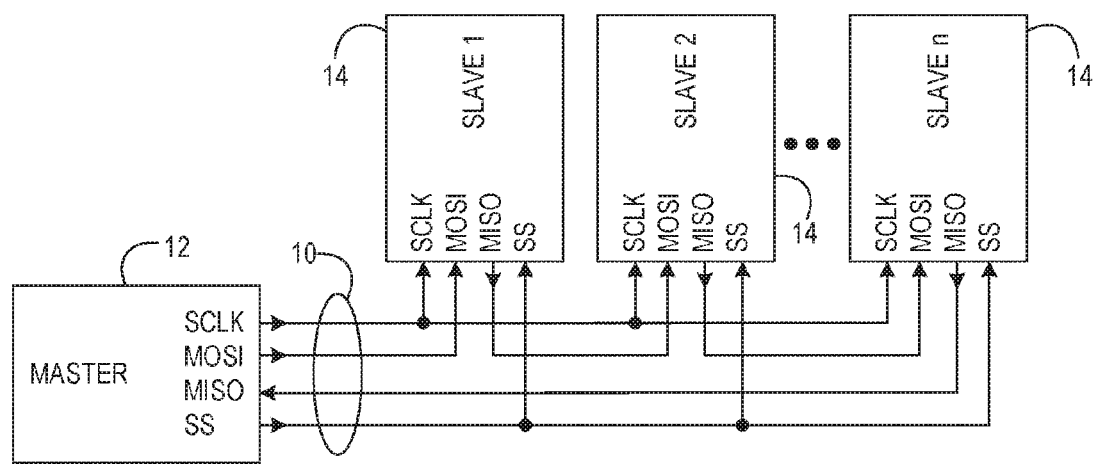

In the example of FIG. 23, the computer system 2300 includes a processor, memory, non-volatile memory, and an interface device. Various common components (e.g., cache memory) are omitted for illustrative simplicity. The computer system 2300 is intended to illustrate a hardware device on which any of the components depicted in the example of FIG. 1 (and any other components described in this specification) can be implemented. For example, the computer system 2300 can be any radiating object or antenna array system. The computer system 2300 can be of any applicable known or convenient type. The components of the computer system 2300 can be coupled together via a bus or through some other known or convenient device.

The processor of computer system 2300 may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 2300. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium". A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 23 reside in the interface.

In operation, the computer system 2300 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Advantages of the Nebula bus communication protocol described in embodiments herein include an increased flexibility in the configuration of chained slave/peripheral devices due to the ability of the slave devices to be placed in any position in the chain without needing to have their chain position pre-configured within the device. Such slave devices do not have to be preconfigured with their identifying address, which is instead determined after power-up and during the discovery and enumeration phases. Increased flexibility is also realized by being able to position the slave devices in true device chains, rather than in device loops where the first and last slave devices in the chain both must reside very near the chain controller element. This enables product architectures that may need to be span longer distances than could be implemented with a typical prior art device chain. The chained slave devices also receive communications from the master chain controller faster and more efficiently than in prior art protocols. For example, reading an address in each device of a 12-device SPI bus chain takes 576 clock cycles assuming 24 bits per device SPI bus transaction. A similar device chain implemented with embodiments of the invention described herein could perform the same operation in under 300 clock cycles, even with a read latency of many clock cycles at the device nodes. The Nebula bus communication protocol also provides greater signal integrity as there are no bus signals shared between all bus devices such as the "select" and "clock" lines of a prior art device chain. This enables longer device chains without special consideration needed for lines that touch many, many pins. Furthermore, the Nebula bus protocol described herein includes the ability to send commands to multiple slaves via a single command packet, and it is not necessary to have a shared clock available to all devices in the chain.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are, at times, shown as being performed in a series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will begin with the words "means for".) Accordingly, the applicant reserves the right to add additional claims after filing the application to pursue such additional claim forms for other aspects of the disclosure.

The detailed description provided herein may be applied to other systems, not necessarily only the system described above. The elements and acts of the various examples described above can be combined to provide further implementations of the invention. Some alternative implementations of the invention may include not only additional elements to those implementations noted above, but also may include fewer elements. These and other changes can be made to the invention in light of the above Detailed Description. While the above description defines certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention.

What is claimed is:

1. A bus communication system comprising:
  a master chain controller comprising a master interface port;
  a first peripheral device comprising a master interface port and a slave interface port;
  a second peripheral device comprising a slave interface port;
  a first communication bus coupling the master interface port of the master chain controller to the slave interface port of the first peripheral device;
  a second communication bus coupling the master interface port of the first peripheral device to the slave interface port of the second peripheral device;
  wherein the first peripheral device is configured to:
    receive a master-to-slave communication packet from the master chain controller via the first communication bus;
    send a copy of the master-to-slave communication packet to the second peripheral device, wherein the first peripheral device is configured to begin sending a copy of a received portion of the master-to-slave communication packet to the second peripheral device during transmission of the master-to-slave communication packet from the master chain controller to the first peripheral device; and
    send an idle state signal to the master chain controller after sending the copy of the master-to-slave communication packet to the second peripheral device.

2. The bus communication system of claim 1 wherein the first communication device is further configured to:
  receive a slave-to-master communication packet from the second peripheral device via the second communication bus;
  send a copy of the slave-to-master communication packet to the master chain controller, wherein the first peripheral device is configured to begin sending a copy of a received portion of the slave-to-master communication packet to the master chain controller during transmission of the slave-to-master communication packet from the second peripheral device to the first peripheral device; and
  send the idle state signal to the master chain controller after sending the copy of the slave-to-master communication packet to the master chain controller.

3. The bus communication system of claim 2 wherein the first peripheral device is further configured to:
  identify, from the slave-to-master communication packet, an available node identification value;
  claim the available node identification value; and
  send the node identification value to the master chain controller after sending the copy of the slave-to-master communication packet to the master chain controller.

4. The bus communication system of claim 2 wherein the first peripheral device further comprises memory having one or more data values stored therein; and
  wherein the first peripheral device is further configured to:
    identify, from the master-to-slave communication packet, an instruction to send a stored data value to the master chain controller;
    acquire the stored data value from the memory; and
    send the acquired stored data value to the master chain controller after sending the copy of the slave-to-master communication packet to the master chain controller.

5. The bus communication system of claim 1 wherein the first peripheral device further comprises memory having one or more data values stored therein;
  wherein the first peripheral device is further configured to:
    identify, from the master-to-slave communication packet, an instruction to send a stored data value to the master chain controller;
    acquire the stored data value from the memory;
    send the acquired stored data value to the master chain controller after sending the copy of the master-to-slave communication packet to the second peripheral device; and
    send the idle state signal to the master chain controller after sending the acquired stored data value to the master chain controller.

6. The bus communication system of claim 1 wherein the first peripheral device further comprises memory having one or more data values stored therein; and
  wherein the first peripheral device is further configured to:
    identify, from the master-to-slave communication packet, an instruction to store a data value in the memory;
    acquire the data value from the master-to-slave communication packet; and
    store the data value in the memory.

7. The bus communication system of claim 6 wherein the first peripheral device is further configured to:
  calculate an instruction delay period; and
  after receiving the master-to-slave communication packet, delay the storing of the data value in the memory by the instruction delay period.

8. The bus communication system of claim 7 wherein the first peripheral device is further configured to calculate the instruction delay period based on a position of the first peripheral device relative to the second peripheral device and based on a predetermined number of clock cycles.

9. The bus communication system of claim 1 wherein the first peripheral device is further configured to:
  set a signal level of an IDLE line of the second communication bus to an active state;
  measure a signal level of a DONE line of the second communication bus;
  if the measured signal level indicates an active state of the DONE line prior to a first threshold, set a flag to a value indicative of a last-node position of the first peripheral node within the bus communication system; and
  if the measured signal level does not indicate an active state of the DONE line prior to the first threshold, refrain from setting the flag to the value indicative of the last-node position.

10. The bus communication system of claim 1 further comprising:
  a bus terminator comprising an interface port;
  a third communication bus comprising a pair of signal lines; and
  wherein the second peripheral device further comprises a master interface port coupled to the bus terminator via the third communication bus.

11. The bus communication system of claim 10 wherein the bus terminator causes the pair of signal lines in the third communication bus to be mechanically shorted together.

12. A communication system comprising:
  a plurality of slave devices, wherein each slave device comprises a master interface port and a slave interface port;

a plurality of communication busses, wherein at least a portion of the communication busses is configured to couple the plurality of slave devices together in a daisy chain arrangement;

a master device comprising a master interface port coupled to the slave interface port of a first slave device of the plurality of slave devices via a master communication bus of the plurality of communication busses;

wherein the first slave device is configured to:
   receive a master-to-slave communication packet from the master device;
   send a copy of the master-to-slave communication packet to another of the plurality of slave devices, wherein the first slave device is configured to begin sending a copy of a received portion of the master-to-slave communication packet to the another of the plurality of slave devices during transmission of the master-to-slave communication packet from the master device to the first slave device; and
   send an idle state signal indicative of an idle state of the first slave device to the master device after sending the copy of the master-to-slave communication packet to the another of the plurality of slave devices.

13. The communication system of claim 12 wherein each bus of the plurality of communication busses comprises:
   a serial data (SDAT) line controllable by an upstream device in a master-to-slave communication direction and controllable by a downstream device in a slave-to-master communication direction;
   a serial clock (SCLK) line exclusively controllable by an upstream device in a master-to-slave communication direction;
   an IDLE line exclusively controllable by an upstream device in a master-to-slave communication direction; and
   a DONE line exclusively controllable by a downstream device in a slave-to-master communication direction.

14. The communication system of claim 13 wherein the master device is configured to:
   set the IDLE line of the master communication bus to an active state indicative of a non-idle state of the master device;
   provide a clock signal on the SCLK line of the master communication bus;
   send the master-to-slave communication packet to the first slave device on the SDAT line of the master communication bus; and
   receive the idle state signal from the first slave device on the DONE line of the master communication bus.

15. The communication system of claim 14 wherein the first slave device is further configured to send a non-idle state signal indicative of a non-idle state of the first slave device to the master device on the DONE line after detecting the non-idle state of the master device.

16. The communication system of claim 13 wherein the communication system further comprises a bus terminator comprising an interface port coupled to the master interface port of a second slave device of the plurality of slave devices via a terminator communication bus of the plurality of communication busses; and
   wherein the bus terminator is configured to mechanically short the IDLE line of the terminator communication bus to the DONE line of the terminator communication bus.

17. A method of communication in a communication bus comprising a master controller device coupled to a plurality of slave devices coupled together in a daisy chain arrangement, the method comprising:
   sending an instruction packet from the master controller device to a primary slave device of the plurality of slave devices coupled to the master controller via a master communication bus;
   initiating the sending of a copy of the instruction packet from the primary slave device to a secondary slave device of the plurality of slave devices coupled to the primary slave device via a slave communication bus during the sending of the instruction packet from the master controller device to the primary slave device;
   completing the sending of the copy of the instruction packet from the primary slave device to the secondary slave device after the master controller device has completed sending the instruction packet to the primary slave device; and
   sending a signal from the primary slave device to the master controller device indicating an idle state of the primary slave device after completing the sending of the copy of the instruction packet to the secondary slave device.

18. The method of claim 17 further comprising wherein, when the instruction packet comprises a read instruction:
   sending a readback packet from the secondary slave device to the primary slave device via the slave communication bus;
   initiating the sending of a copy of the readback packet from the primary slave device to the master controller device during the sending of the readback packet to the primary slave device;
   completing the sending of the copy of the readback packet from the primary slave device to the master controller device after the secondary slave device has completed sending the readback packet to the primary slave device; and
   sending the signal indicating the idle state of the primary slave device after completing the sending of the copy of the readback packet to the master controller device.

19. The method of claim 18 further comprising wherein, when the instruction packet comprises a read instruction:
   acquiring a memory storage address from the instruction packet;
   acquiring a stored data value from memory of the primary slave device at the storage address;
   sending the acquired stored data value to the master controller device after completing the sending of the copy of the readback packet; and
   sending the signal indicating the idle state of the primary slave device after sending the acquired stored data value to the master controller device.

20. The method of claim 17 further comprising wherein, when the instruction packet comprises a write instruction:
   acquiring a data value from the instruction packet;
   acquiring a memory storage address from the instruction packet; and
   storing the data value in memory of the primary slave device at a memory address identified by the memory storage address.

21. The method of claim 17 wherein the master communication bus comprises:
   a serial data (SDAT) line controllable by the master controller device and controllable by the primary slave device;
   a serial clock (SCLK) line exclusively controllable by the master controller device;

an IDLE line exclusively controllable by the master controller device; and a DONE line exclusively controllable by the primary slave device.

22. The method of claim 21 further comprising:

setting the IDLE line of the master communication bus to an active state indicative of a non-idle state of the master device;

providing a clock signal on the SCLK line of the master communication bus;

sending the instruction packet to the primary slave device on the SDAT line of the master communication bus; and receiving the signal from the primary slave device on the DONE line of the master communication bus.

* * * * *